(12) United States Patent
Seo et al.

(10) Patent No.: US 9,213,598 B2
(45) Date of Patent: Dec. 15, 2015

(54) NONVOLATILE MEMORY DEVICE AND METHOD OF OPERATING THE SAME

(71) Applicant: SAMSUNG ELECTRONICS CO., LTD., Suwon-si, Gyeonggi-do (KR)

(72) Inventors: Youngil Seo, Suwon-si (KR); Jungho Yun, Seoul (KR); Wonchul Lee, Yongin-si (KR); Dawoon Jung, Hwaseong-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 133 days.

(21) Appl. No.: 14/175,342

(22) Filed: Feb. 7, 2014

(65) Prior Publication Data

US 2014/0237319 A1 Aug. 21, 2014

(30) Foreign Application Priority Data

Feb. 19, 2013 (KR) .................. 10-2013-0017627

(51) Int. Cl.
*G11C 29/00* (2006.01)
*G06F 11/10* (2006.01)

(52) U.S. Cl.
CPC .................. *G06F 11/1048* (2013.01)

(58) Field of Classification Search
CPC .............. G06F 11/187; G06F 11/1048; G06F 11/1479
USPC .......................................................... 714/764
See application file for complete search history.

(56) References Cited

U.S. PATENT DOCUMENTS

| 5,463,646 | A | * | 10/1995 | Dillon et al. .................. 714/822 |
| 8,010,873 | B2 | | 8/2011 | Kirschner et al. |
| 8,392,810 | B2 | | 3/2013 | Linsky et al. |
| 8,417,899 | B2 | | 4/2013 | Roush |
| 8,438,455 | B2 | * | 5/2013 | Vogan et al. .................. 714/764 |
| 8,516,354 | B2 | * | 8/2013 | Yang .............................. 714/797 |
| 8,631,310 | B2 | * | 1/2014 | Yang .............................. 714/797 |
| 2009/0292971 | A1 | | 11/2009 | Man et al. |
| 2010/0174966 | A1 | | 7/2010 | Kim et al. |
| 2010/0218073 | A1 | | 8/2010 | Kang et al. |
| 2010/0241929 | A1 | | 9/2010 | Song et al. |
| 2010/0296350 | A1 | | 11/2010 | Kim et al. |
| 2011/0083039 | A1 | | 4/2011 | Kim et al. |
| 2011/0138254 | A1 | | 6/2011 | Yang |
| 2011/0191649 | A1 | | 8/2011 | Lim et al. |

(Continued)

FOREIGN PATENT DOCUMENTS

| JP | 2011076706 | 4/2011 |
| KR | 1020070094370 | 9/2007 |

(Continued)

*Primary Examiner* — David Ton
(74) *Attorney, Agent, or Firm* — F. Chau & Associates, LLC

(57) ABSTRACT

A nonvolatile memory device includes a nonvolatile memory, a buffer memory configured to store a plurality of read data transmitted from the nonvolatile memory, an error detection and correction circuit configured to detect an error in partial data of each of the plurality of read data and judging whether the partial data is correctable or not on the basis of the detected error, and a controller configured to analyze the uncorrectable partial data with respect to the plurality of read data to determine a representative value, and to transmit the representative value to the error detection and correction circuit. The plurality of read data is read through a read operation with respect to a same page.

20 Claims, 20 Drawing Sheets

(56) References Cited

U.S. PATENT DOCUMENTS

2012/0084627 A1 4/2012 Post et al.
2013/0139035 A1 5/2013 Zhong et al.

FOREIGN PATENT DOCUMENTS

| | | |
|---|---|---|
| KR | 1020100080691 | 7/2010 |
| KR | 1020100096616 | 9/2010 |
| KR | 1020100104840 | 9/2010 |
| KR | 1020100124892 | 11/2010 |
| KR | 1020110036398 | 4/2011 |
| KR | 1020110089728 | 8/2011 |
| WO | 2011090680 | 7/2011 |
| WO | 2011113034 | 9/2011 |

* cited by examiner

| Number of read | A | C | B |
|---|---|---|---|
| 1 | 1 | 1 | 0 |
| 2 | 1 | 1 | 0 |
| 3 | 1 | 0 | 0 |
| 4 | 1 | 1 | 0 |
| . | . | . | . |
| N | 1 | 0 | 0 |

Fig. 7

| Sector0 | Sector1 | Sector2 | ... | SectorK-1 | 1st Read |
| Sector0 | Sector1 | Sector2 | ... | SectorK-1 | 2nd Read |
| Sector0 | Sector1 | Sector2 | ... | SectorK-1 | 3rd Read |
| Sector0 | Sector1 | Sector2 | ... | SectorK-1 | 4th Read |
| Sector0 | Sector1 | Sector2 | ... | SectorK-1 | Nth Read |

Pass / Fail

NONVOLATILE MEMORY DEVICE AND METHOD OF OPERATING THE SAME

CROSS-REFERENCE TO RELATED APPLICATIONS

This U.S. non-provisional patent application claims priority under 35 U.S.C. §119 to Korean Patent Application No. 10-2013-0017627, filed on Feb. 19, 2013, the disclosure of which is incorporated by reference in its entirety herein.

BACKGROUND

1. Technical Field

Exemplary embodiments of the present inventive concept relate to a memory controller and a method of operating the same.

2. Discussion of Related Art

A semiconductor memory device may be a volatile semiconductor memory device or a nonvolatile semiconductor memory device. A volatile semiconductor memory device is capable of realizing a high speed read/write speed but is unable to retain its stored data when an external power supply is interrupted. A nonvolatile semiconductor memory device retains its stored data even when an external power supply is interrupted. Thus, the nonvolatile semiconductor memory device is used when contents need to be preserved regardless of whether power is supplied or not.

Erase and write operations of a programmable read only memory (PROM) and an erasable PROM (EPROM) cannot be performed easily and it may be difficult for users to renew memorized contents. Since erase and write operations of an electrically EPROM (EEPROM) can be performed electrically, an EEPROM may be applied to a system that needs continuous renewal or an auxiliary memory device. Since a flash EEPROM (hereinafter it is referred to as a 'flash memory device') has a high integration as compared with a conventional EEPROM, it can be applied to a high capacity auxiliary memory device. A NAND-type flash memory device has very high integration as compared with other flash EEPROMs.

However, a flash memory device may become faulty if it is programmed or erased more times than it can support.

SUMMARY

According to an exemplary embodiment of the inventive concept, a memory controller is configured to control a nonvolatile memory device. The memory controller includes a memory, an error detection and correction circuit, and a processing unit. The memory is configured to store a plurality of read data, which is transmitted from the nonvolatile memory device. The error detection and correction circuit detects an error bit of partial data of each of the plurality of read data and judges whether the partial data is correctable or not on the basis of the detected error bit. The processing unit analyzes uncorrectable partial data to determine a representative value and transmits the representative value to the error detection and correction circuit. The plurality of read data is read through a read operation with respect to a same logical page.

According to an exemplary embodiment of the inventive concept, a method of operating a memory controller to control a nonvolatile memory device includes (a) detecting an error bit of partial data constituting each of a plurality of read data transmitted from the nonvolatile memory device; (b) judging whether the partial data is correctable or not on the basis of the error bit; and (c) analyzing the partial data to determine a representative value if the partial data is uncorrectable. The plurality of read data is read through a read operation with respect to the same logical page, and the steps (a) and (b) may repeatedly be performed on each of the plurality of read data.

According to an exemplary embodiment of the inventive concept, a method of operating a memory controller to control a nonvolatile memory device includes: detecting an error bit of partial data of each of a plurality of read data transmitted from the nonvolatile memory device, judging whether each partial data is correctable or not on the basis of the corresponding detected error bit, analyzing the partial data to determine a representative value if the partial data is uncorrectable, and performing error correction using the representative value. The plurality of read data is read through a read operation with respect to a same logical page.

According to an exemplary embodiment of the inventive concept, a memory controller is configured to control a nonvolatile memory device. The memory controller includes a memory interface, an error detection unit, a processing unit, and an error correction unit. The memory interface is configured to read data from a same word line of the nonvolatile memory device a number N times to generate N instances of the read data, where N is at least 2 and each instance comprises a plurality of sectors. The error detection unit is configured to detect whether a same sector in all the instances is uncorrectable. The processing unit is configured to determine a representative value from all the instances of the uncorrectable sector and output the representative value. The error correction unit is configured to correct the uncorrectable sector using the representative value.

According to an exemplary embodiment of the inventive concept, a nonvolatile memory device includes a nonvolatile memory, a buffer memory configured to store a plurality of read data transmitted from the nonvolatile memory, an error detection and correction circuit configured to detect an error in partial data of each of the plurality of read data and judging whether the partial data is correctable or not on the basis of the detected error, a controller configured to analyze the uncorrectable partial data with respect to the plurality of read data to determine a representative value, and to transmit the representative value to the error detection and correction circuit. The plurality of read data is read through a read operation with respect to a same page.

According to an exemplary embodiment of the inventive concept, a method of operating a nonvolatile memory device includes: detecting an error in partial data of each of a plurality of read data; judging whether each partial data is correctable or not on the basis of the corresponding detected error, analyzing the partial data with respect to the plurality of read data to determine a representative value if the partial data is uncorrectable, and restoring an error bit of the uncorrectable partial data by using the representative value. The plurality of read data is read through a read operation with respect to a same page, and the detecting and judging is repeatedly performed on each of the plurality of read data.

According to an exemplary embodiment of the inventive concept, a nonvolatile memory device includes a nonvolatile memory, a memory interface configured to read data from a same word line of the nonvolatile memory a number N times to generate N instances of the read data, where N is at least two, and each of the instances include a plurality of sectors, an error detection unit configured to detect whether a same sector in all the instances is uncorrectable, a controller configured to determine a representative value from all the instances of the uncorrectable sector and output the representative value, and an error correction unit configured to correct the uncorrectable sector by using the representative value.

BRIEF DESCRIPTION OF THE FIGURES

Exemplary embodiments of the inventive concept will be described below in more detail with reference to the accompanying drawings. Like numbers refer to like elements throughout.

FIG. 7 is a block diagram for explaining an exemplary operation of an ECC circuit of FIG. 1.

DETAILED DESCRIPTION

Figure 1:
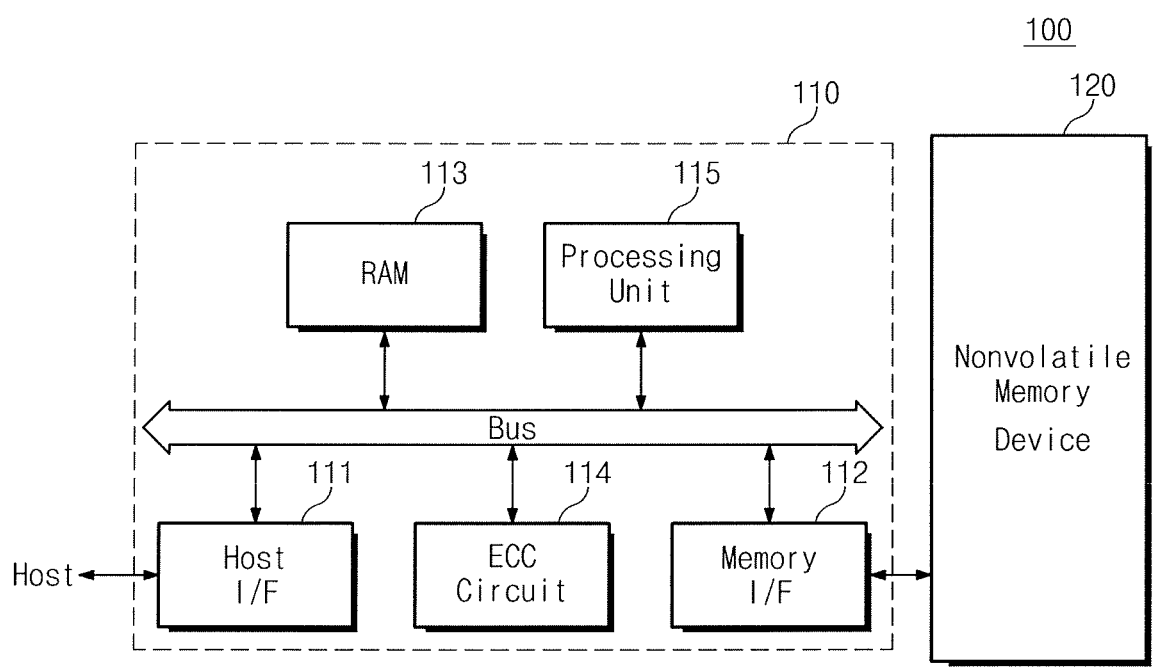
FIG. 1 is a block diagram illustrating a memory system according to an exemplary embodiment of the inventive concept.

The inventive concept will be described more fully hereinafter with reference to the accompanying drawings, in which exemplary embodiments thereof are shown. The inventive concept may, however, be embodied in many different forms and should not be construed as limited to the embodiments set forth herein. In the drawings, the size and relative sizes of layers and regions may be exaggerated for clarity. Like numbers refer to like elements throughout.

FIG. 1 is a block diagram illustrating a memory system according to an exemplary embodiment of the inventive concept.

Referring to FIG. 1, a memory system 100 includes a memory controller 110 and a nonvolatile memory device 120.

For convenience of description, it is assumed that the nonvolatile memory device 120 is a NAND-type flash memory device. However, the nonvolatile memory device 120 is not limited to the NAND-type flash memory device. The nonvolatile memory device 120 may be a NOR-type flash memory device, a resistive random access memory (RRAM) device, a phase change memory (PRAM) device, a magnetic random access memory (MRAM) device, a ferroelectric random access memory (FRAM) device, etc.

The memory controller 110 is connected to a host and the nonvolatile memory device 120. The memory controller 110 is configured to provide an interface between the nonvolatile memory device 120 and the host. The memory controller 110 is configured to drive (execute) a firmware for controlling the nonvolatile memory device 120. For example, the memory controller 110 provides a control signal CMD and an address ADD to the nonvolatile memory device 120. The memory controller 110 exchanges data with the nonvolatile memory device 120.

In response to a request from the host, the memory controller 110 accesses the nonvolatile memory device 120. The memory controller 110 can control read, write, erase and background operations of the nonvolatile memory device 120. In the case of controlling the read operation, the memory controller 110 provides a read control signal and an address to the nonvolatile memory device 120.

The memory controller 110 can control the nonvolatile memory device 120 so that data is read by applying a same read voltage to a selected word line. The nonvolatile memory device 120 reads stored data using a read voltage having a predetermined level and can transmit the read data to the memory controller 110 whenever data is read. The read data may be transmitted to the memory controller 110 in units of pages.

The memory controller 110 includes a host interface 111, a memory interface 112, a RAM 113, an error detection & correction circuit ECC 114 and a processing unit 115. The host interface 111, the memory interface 112, the RAM 113, the error detection & correction circuit ECC 114 and the processing unit 115 are connected to one another through a bus to exchange data with one another. As an example, the processing unit 115 may be a central processing unit (CPU), a processor, a graphics processing unit, etc. The error detection & correction circuit 114 may include one circuit/unit for performing the error detection and another separate circuit/unit for performing the error correction, or the same circuit/unit may perform both error detection and error correction.

The host interface 111 includes a protocol for exchanging data between the host and the memory controller 110. For example, the memory controller 110 may be configured to communicate with the outside (e.g., host) through at least one of various interface protocols such as a universal serial bus (USB) protocol, a multimedia card (MMC) interface protocol, a peripheral component interconnection (PCI) protocol, a PCI-express (PCI-E) protocol, an advanced technology attachment (ATA) protocol, a serial ATA protocol, a parallel ATA protocol, a small computer system interface (SCSI) protocol, an enhanced small disk interface (ESDI) protocol and an integrated drive electronics (IDE) protocol.

The memory interface 112 interfaces with the nonvolatile memory device 120. The memory interface 112 may include a NAND interface or a NOR interface.

The RAM 113 may be used as a cache memory between the nonvolatile memory device 120 and the host. The RAM 113 can store read data being transmitted from the nonvolatile memory device 120. As described above, in the case that the nonvolatile memory device 120 reads data by applying a same voltage to a selected word line, the RAM 113 stores read data being transmitted whenever the nonvolatile memory device 120 reads data. The RAM 113 may be used as an operation memory of the processing unit 115. The RAM 113 may be used as a buffer memory between the nonvolatile memory device 120 and the host.

The error detection & correction circuit 114 may be configured to detect an error bit of data (e.g., read data transmitted from the nonvolatile memory device 120) stored in the RAM 113 using an error correction code and correct the detected error bit. The error detection & correction circuit 114 may be embodied to decode data using an error correction code. The error correction & detection circuit 114 may be embodied by various types of code decoders. For instance, the error detection & correction circuit 114 may be embodied by a decoder performing an unsystematic code decoding or a decoder performing a systematic code decoding.

For example, the error detection & correction circuit 114 may detect an error bit with respect to units of sectors of each of read data. Each read data may include a plurality of the sectors. A sector may be a data unit smaller than a page which is a read unit of a flash memory device. Sectors constituting each read data may correspond to each other by the medium of an address.

The error detection & correction circuit 114 calculates a bit error rate (BER) and judges whether an error bit of a sector can be corrected or not. For example, if the bit error rate (BER) is higher than a reference value, the error detection & correction circuit 114 judges that the corresponding sector is uncorrectable (e.g., failed), and if the bit error rate (BER) is lower than the reference value, the error detection & correction circuit 114 judges that the corresponding sector is correctable or is able to be corrected (e.g., passed).

The error detection & correction circuit 114 can sequentially perform operations of error detection and correction on all the read data. In the case that a sector included in the read data is correctable, the error detection & correction circuit 114 can omit the operations of error detection and correction with respect to the following read data. For example, when a sector of read data is correctable, the error detection and correction circuit 114 can omit the operations of error detection and correction with respect to subsequent read data. If the error detection & correction circuit 114 completes the operations of error detection and correction with respect to all the read data, the error detection & correction circuit 114 may detect a sector judged to be uncorrectable. The number of sectors judged to be uncorrectable may be one or more. The error detection & correction circuit 114 can transmit information (e.g., address information) about the sector(s) judged to be uncorrectable to the processing unit 115.

The processing unit 115 receives the uncorrectable sector information from the error detection & correction circuit 114. The processing unit 115 can access the RAM 113 to perform an arithmetic operation on data bits of the uncorrectable sectors included in each of the read data, and thereby a representative value can be determined. For example, the processing unit 115 may select a bit which is most frequently obtained among the data bits of the uncorrectable sector, and may determine the selected bit as the representative value. This example will be shown in detail with reference to FIG. 8.

The processing unit 115 transmits the extracted representative value to the error detection & correction circuit 114.

The error detection & correction circuit 114 detects an error bit of the representative value and corrects the detected error bit.

As described above, the memory controller 110 and the memory system including the memory controller 110 can restore an error bit of the uncorrectable read data. The memory controller 110 can select a bit which is most frequently obtained among the data bits of the uncorrectable sector to extract the representative value, and can detect an error bit using the representative value to correct the detected error. Further, the memory controller 110 and the memory system 100 including the memory controller 110 can reduce an occurrence rate of bad blocks caused by occurrence of uncorrectable read data.

Figure 2:
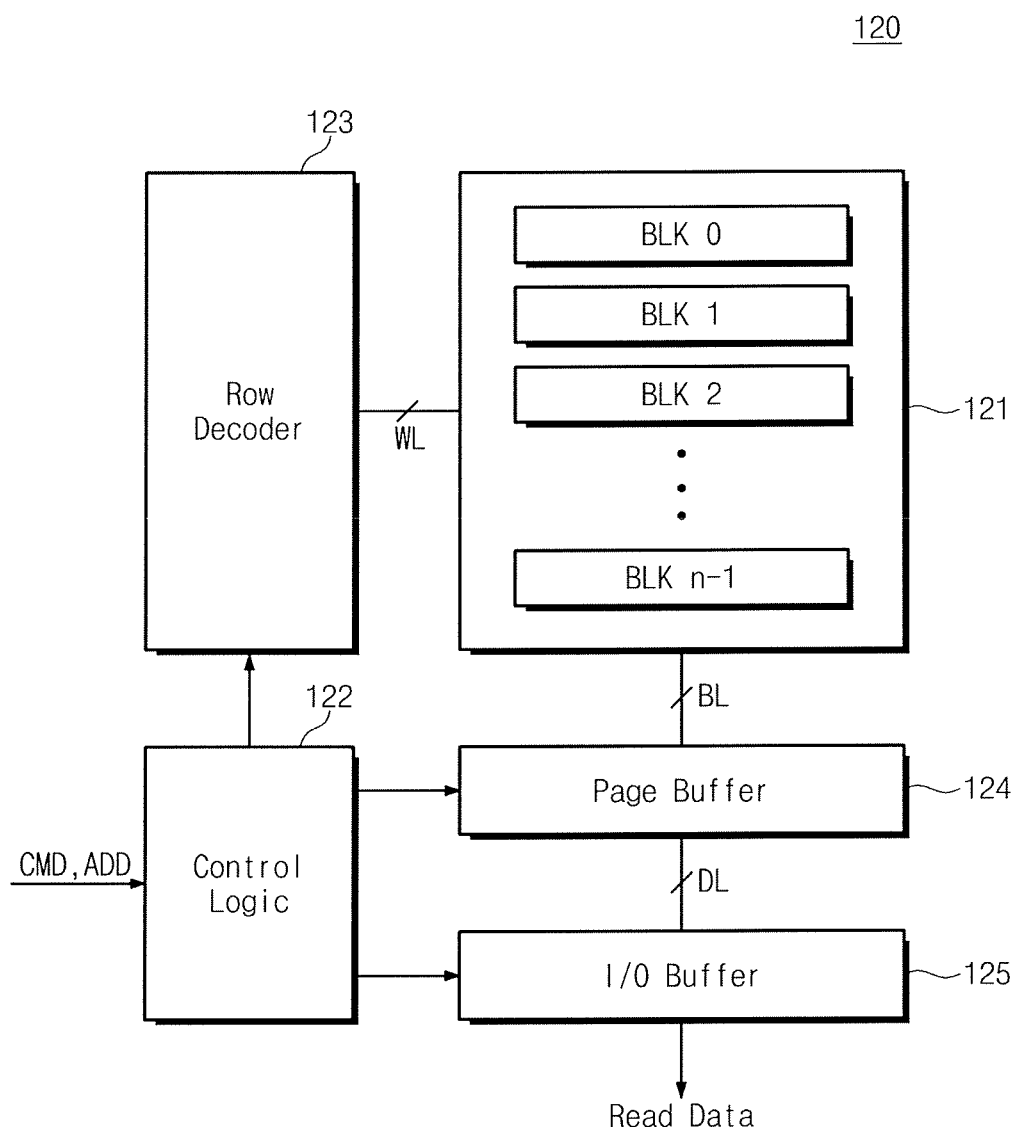
FIG. 2 is a block diagram illustrating a nonvolatile memory device of FIG. 1 according to an exemplary embodiment of the inventive concept.

FIG. 2 is a block diagram illustrating the nonvolatile memory device 120 of FIG. 1 according to an exemplary embodiment of the inventive concept.

Referring to FIG. 2, the nonvolatile memory device 120 includes a memory cell array 121, a control logic 122, a row decoder 123, a page buffer 124 and an input/output buffer 125.

The memory cell array 121 includes a plurality of memory blocks BLK0-BLKn−1. Each of the memory blocks BLK0-BLKn−1 comprise a plurality of pages. Each page includes a plurality of memory cells. Each memory cell may be disposed in a region where a word line WL and a bit line BL cross each other.

The control logic 122 may control the entire operation of the nonvolatile memory device 120. The control logic 122 may include a high voltage generator. The control logic 122 can generate high voltages needed to perform program, read and erase operations in response to a control signal CMD from the memory controller 110 of FIG. 1. When a read operation is performed, the control logic 122 applies a read voltage $V_{rd}$ and a read pass voltage to the memory cell array 121 through the row decoder 123. The control logic 122 transmits an address ADD being transmitted from the memory controller 110 to the row decoder 123 and the page buffer 124.

The page buffer 124 operates as a write driver or a sense amplifier depending on an operation mode. The page buffer 124 may operate as the sense amplifier when a read operation is performed. The page buffer 124 may receive data from the memory cell array 121 in units of pages when the read operation is performed. The page buffer 124 receives the least significant bit (LSB) data or the most significant bit (MSB) data from the memory cell array 121 in units of pages corresponding to a page address.

The input/output buffer 125 is configured to exchange data with the outside. Data being received from the outside is transmitted to the page buffer 124 through data lines DL. Data being transmitted from the page buffer 124 to the input/output buffer 125 is output to the outside (e.g., a memory controller). For instance, the input/output buffer 125 transmits read data to the memory controller 110. The input/output buffer 125 may include a data buffer.

Figure 3:
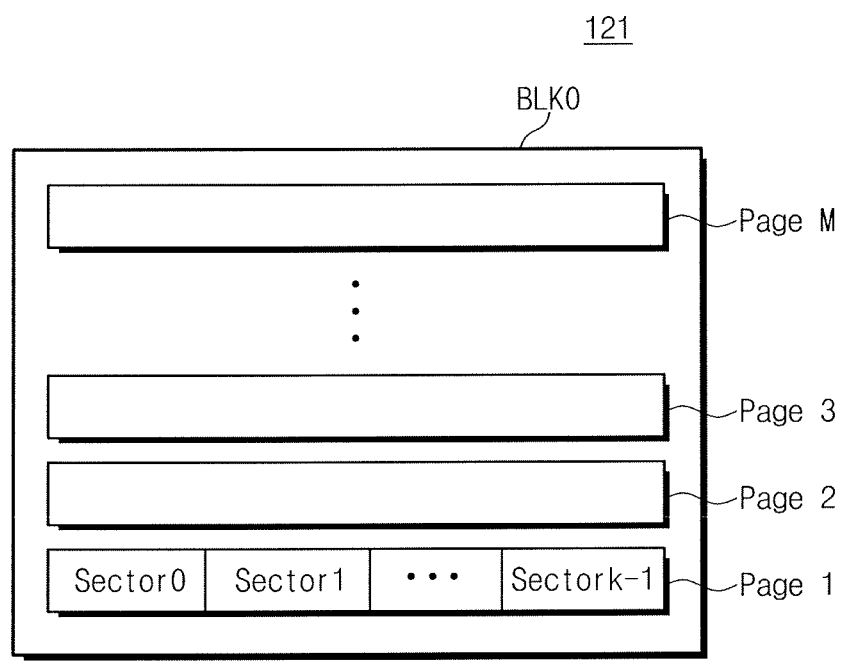
FIG. 3 is a block diagram illustrating a first memory block BLK0 of a memory cell array 121 of FIG. 2.

FIG. 3 is a block diagram illustrating a first memory block BLK0 of a memory cell array 121 of FIG. 2. The first memory block BLK0 includes a plurality of memory cell groups.

Memory cells corresponding to one row may form one memory cell group (e.g., cell page). The memory cell group may be connected to one of word lines WL.

The first memory block BLK0 may include first through $M^{th}$ pages Page 1-Page M. Each page may include $0^{th}$ through $(K-1)^{th}$ sectors Sector 0-Sector K−1. Each sector includes a plurality of memory cells sharing one word line (not shown).

In FIG. 3, only the first memory block BLK0 is illustrated but the memory blocks BLK1-BLKn−1 may be configured the same as the first memory block BLK0. In case of a NAND-type flash memory, read and program operations are performed in units of pages.

Figure 4:
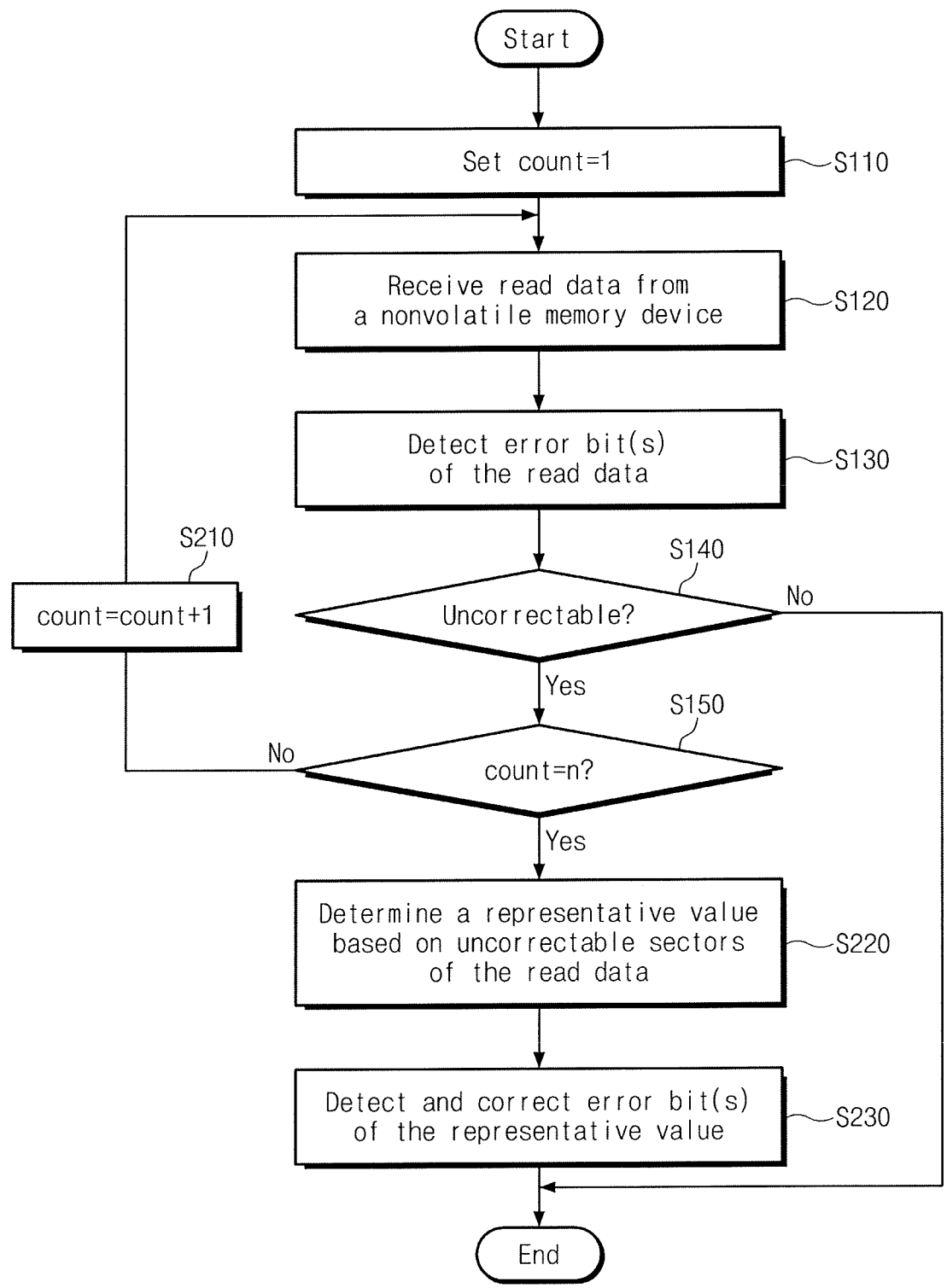
FIG. 4 is a flow chart illustrating a method of operating a memory controller according to an exemplary embodiment of the inventive concept.

FIG. 4 is a flow chart illustrating a method of operating a memory controller according to an exemplary embodiment of the inventive concept.

In a step S110, a variable named count (hereinafter it is referred to as a 'count') is set to '1'. The count is used to represent the number of times that the nonvolatile memory device 120 reads data by applying a read voltage to a selected word line.

In a step S120, the memory controller 110 receives read data from the nonvolatile memory device 120. The read data may be transmitted from the nonvolatile memory device 120 to the memory controller 110 in units of pages. The transmitted read data may be stored in the RAM 113 of the memory controller 110.

In a step S130, the error detection & correction circuit 114 accesses the RAM 113 to detect an error bit of the read data. The error detection & correction circuit 114 may detect an error bit of the read data to correct the detected error bit in units of sectors.

In a step S140, the error detection & correction circuit 114 judges whether each sector of the read data is correctable or not. The error detection & correction circuit 114 can judge whether a correction with respect to each of sectors Sector 0-Sector K−1 of the read data is possible or not. In the case that at least one sector is uncorrectable, the process goes to a step S150. In the case that all the sectors are correctable, the process ends.

In the step S150, it is judged whether the count reaches the predetermined number of times (n, n≥2 is a natural number) or not. In the case that the count reaches the predetermined number of times, the process goes to a step S220. In the case that the count does not reach the predetermined number of times, the process goes to a step S210.

In the step S210, the count is increased by '1'. After that, the steps S120 through S150 may be repeatedly performed. In the step S120, read data being transmitted to the memory controller 110 may mean read data which is read by a following read operation. In each read operation, as described above, data may be read by applying a same voltage to a same selected word line. In the step S130, the error detection & correction circuit 114 detects an error bit of the read data to correct the detected error bit. The detection and correction may be performed in units of sectors.

In an exemplary embodiment, the error detection & correction circuit 114 does not perform operations of error detection and correction on a sector judged to be correctable among sectors of the read data read by a previous read operation. In a loop in which the count has a value of '2' or more, the error detection & correction circuit 114 may perform the operations of error detection and correction only on a sector judged to be uncorrectable among sectors of the read data.

On the basis of the process described above, the steps S120 through S150 may be repeated until the count reaches the predetermined number of times. In the case that the count reaches the predetermined number of times, the error detection & correction circuit 114 transmits information about a sector judged to be uncorrectable to the processing unit 115. The number of sectors judged to be uncorrectable may be one or more.

In the case that the count reaches the predetermined number of times, the step S220 is performed. In the step S220, the processing unit 115 performs an arithmetic operation on data bits of uncorrectable sectors included in each of the read data stored in the RAM 113 to determine a representative value. The processing unit 115 transmits the determined representative value to the error detection & correction circuit 114. The process determining the representative value will be shown in detail with reference to FIG. 8.

In a step S230, the error detection & correction circuit 114 perform the operations of error detection & correction on the representative value. For example, the error detection & correction circuit 114 may use the representative value to correct the sectors that were originally determined to be uncorrectable.

Figure 5:
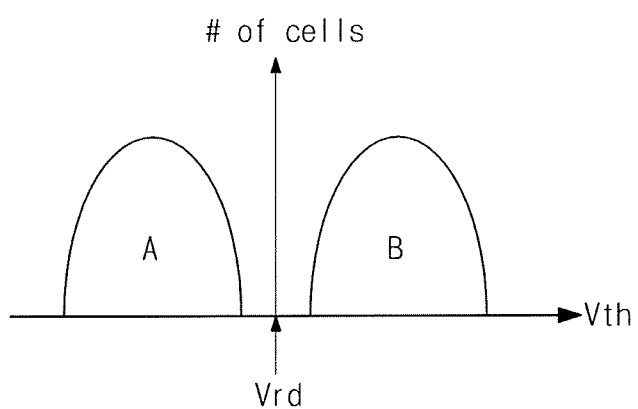
FIGS. 5 and 6 illustrate a change of distribution of cell threshold voltage in accordance with the number of program/erase cycles.
Figure 6:
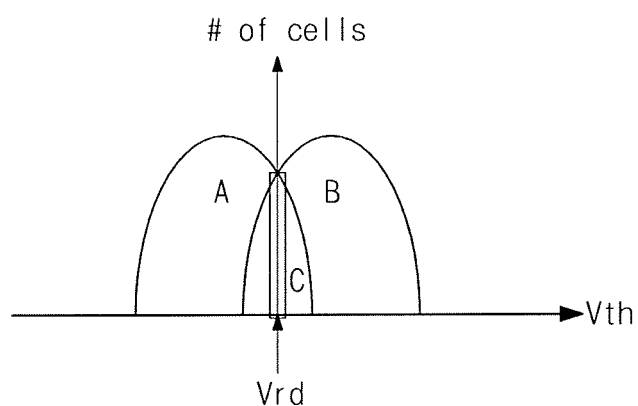

FIGS. 5 and 6 illustrate a change of distribution of cell threshold voltage in accordance with the number of program/erase cycles.

Referring to FIG. 5, illustrated is a distribution of cell threshold voltage of the case where the number of program/erase cycles is small. As illustrated in FIG. 5, in the case that a read operation is performed using a read voltage $V_{rd}$, cells having a distribution of threshold voltage like A are read '1' and cells having a distribution of threshold voltage like B are read '0'. In the case of repeatedly performing the read operation using the same read voltage $V_{rd}$, a read value may be almost the same.

Referring to FIG. 6, illustrated is a distribution of cell threshold voltage of the case where the number of program/erase cycles is large or exceeds the number supported by the memory. When the number of program/erase cycles increases, a distribution of cell threshold voltage is widened and thereby a region C in which distributions of cell threshold voltage overlap each other may be generated. As illustrated in FIG. 6, in the case that a read operation is performed using a read voltage $V_{rd}$, cells having a distribution of a threshold voltage like A is read '1' and cells having a distribution of a threshold voltage like B is read '0'. The read voltage $V_{rd}$ may have the same level as the read voltage $V_{rd}$ illustrated in FIG. 5.

However, if the read operation is repeatedly performed using a same read voltage, a bit flip that a read data value is changed by an internal noise of a memory chip or a noise of an external environment may occur in the overlapped region C. Among cells having a distribution of threshold voltage like C, cells having a similar threshold voltage to a level of the read voltage $V_{rd}$ may be read '1' at the first read operation and may be read '0' at the third read operation. The bit flip may become a cause of an increased bit error rate (BER).

FIG. 7 is a block diagram for explaining an exemplary operation of the error detection & correction circuit of FIG. 1.

Referring to FIG. 7, read data read by applying the same read voltage to a selected word line is illustrated. Reading data by applying a read voltage to a selected word line may be defined as a read operation. Read data read by the read operation may comprise a plurality of sectors.

The error detection & correction circuit 114 can detect an error bit with respect to each of the read data to correct the detected error bit in units of sectors. The error detection & correction circuit 114 can calculate a bit error rate (BER) and can judge whether the error bit can be corrected or not in units of sectors. For example, if the BER exceeds a threshold value, it is determined that the error bit cannot be corrected, and if the BER at or below the threshold value, it is determined that the error bit can be corrected.

In an exemplary embodiment, the error detection & correction circuit 114 does not perform operations of error detection and correction on a sector judged to be correctable among sectors of read data read by a previous read operation.

A first sector Sector 0 of the read data read by the first read operation is judged to be correctable (passed). The error detection & correction circuit 114 does not perform operations of error detection and correction on the first sector Sector 0 of read data read by read operations ($2^{nd}$ Read-$N^{th}$ Read) after the first read operation ($1^{st}$ Read).

Similarly, a second sector Sector 1 of the read data read by the third read operation ($3^{rd}$ Read) is judged to be correctable (passed). The error detection & correction circuit 114 does not perform operations of error detection and correction on the second sector Sector 1 of read data read by read operations ($4^{th}$ Read-$N^{th}$ Read) after the third read operation ($3^{rd}$ Read).

On the other hand, a third sector Sector 2 is judged to be uncorrectable (failed) in all the read data. The error detection & correction circuit 114 transmits information (e.g., address information) about the third sector Sector 2 to the processing unit 115.

Figure 8:
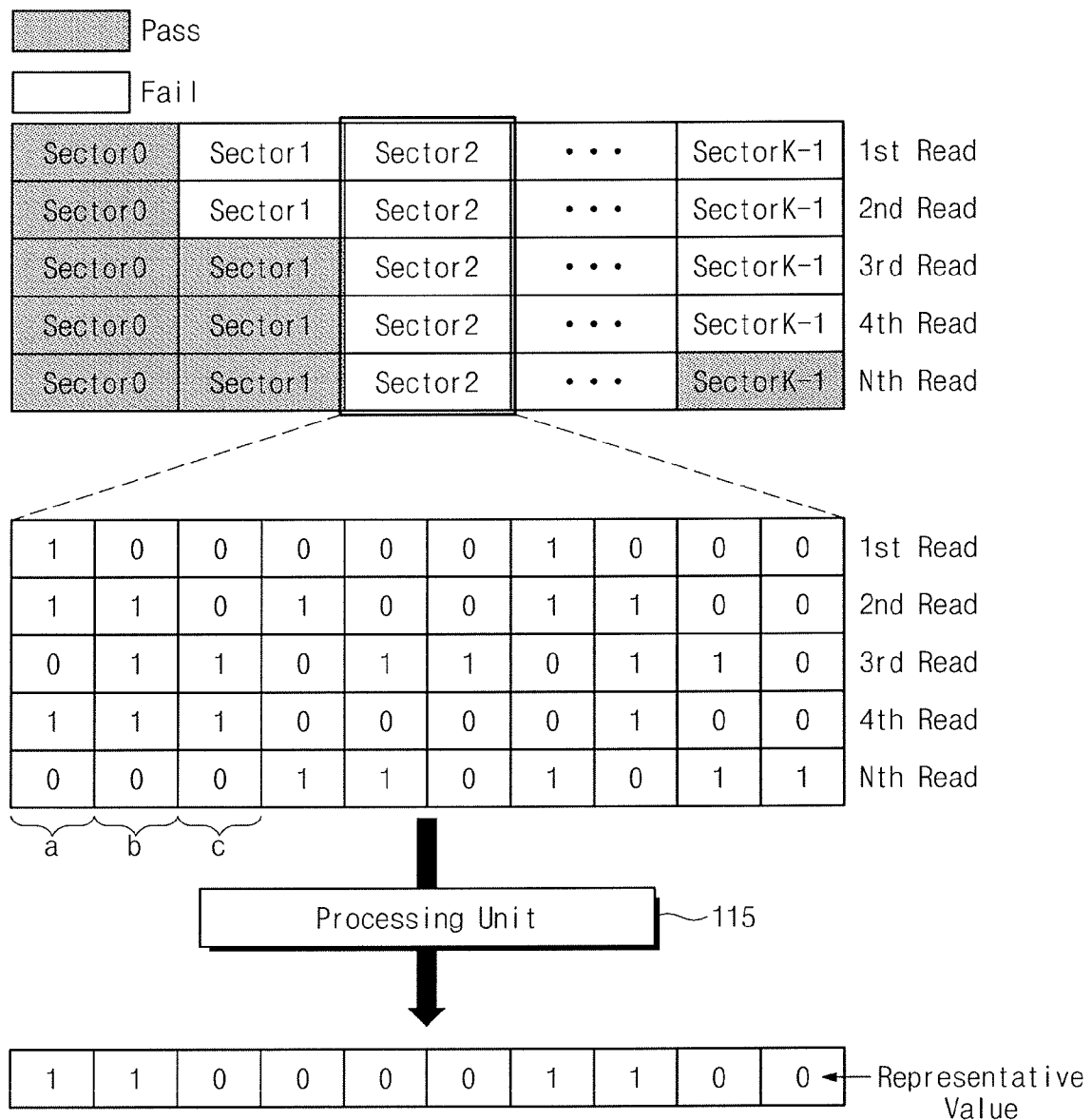
FIG. 8 is a block diagram for explaining an exemplary operation of a processing unit of FIG. 1.

FIG. 8 is a block diagram for explaining an exemplary operation of a processing unit of FIG. 1.

Referring to FIG. 8, data bits of the third sector Sector 2 are illustrated. The third sector Sector 2 is illustrated to include ten data bits in FIG. 8, but the inventive concept is not limited thereto. For example, each sector may include a lesser or greater number of data bits.

The processing unit 115 performs an arithmetic operation on data bits of the third sector Sector 2 of each read data stored in the RAM 113 to determine a representative value. The processing unit 115 can determine a representative value according to the most frequently occurring algorithm. The most frequently occurring algorithm may be understood to be an algorithm determining a value which is most frequently obtained with respect to each of data bits of a sector repeatedly read as the representative value.

For example, in the case of an 'a' data bit among data bits of the third sector Sector 2, the processing unit 115 determines '1' as the representative value because '1' more frequently occurs (e.g., '1' has 3 occurrences, while '0' has 2 occurrences). In the case of a 'b' data bit among data bits of the third sector Sector 2, the processing unit 115 determines '1' as the representative value because '1' more frequently occurs (e.g., '1' has 3 occurrences, while '0' has 2 occurrences). In the case of 'c' data bit among data bits of the third sector Sector 2, the processing unit 115 determines '0' as the representative value because '0' more frequently occurs (e.g., '0' has 3 occurrences, while '1' has 2 occurrences). The representative values may be determined with respect to the rest of the data bits using the same method. The processing unit 115 may determine the representative values of the data bits of the third sector Sector 2 using the most frequently occurring algorithm as described above.

Figure 9:
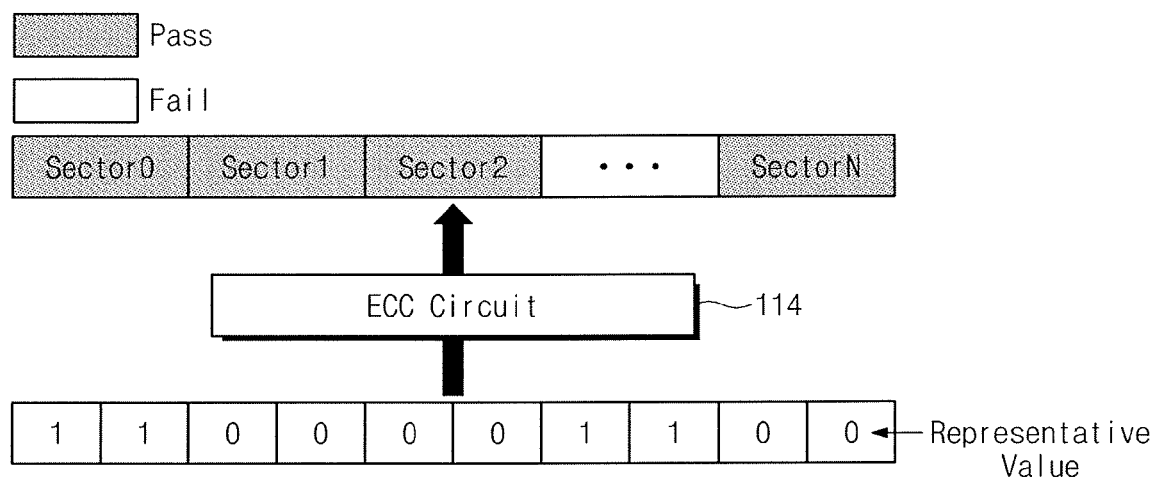
FIG. 9 is a block diagram illustrating that a representative value of FIG. 8 is processed through an ECC circuit of FIG. 1.

FIG. 9 is a block diagram illustrating that the representative values of FIG. 8 are processed through the error detection & correction circuit of FIG. 1.

Referring to FIG. 9, the representative values determined by the processing unit 115 are transmitted to the error detection & correction circuit 114.

The error detection & correction circuit 114 can detect an error bit of the representative values to correct the detected error. Since the representative values, as described above, are comprised of the data bits which are most frequently obtained among read data, it is quite probable that they are judged to be correctable.

In an exemplary embodiment of the inventive concept, a predetermined amount N of reads of data from the same word line in a memory is used to correct a sector of data within the word line. For the below example, it is assumed that N=5 and the read data of the word line includes 4 sectors. Accordingly in this example, the word line is read 5 times, and thus there will 5 instances of each of the 4 sectors. If all 5 instances of one of the sectors is uncorrectable, a representative value is created from the 5 instances of the uncorrectable sector. The representative value may be generated as described above. Since the one sector was previously uncorrectable, it can be substituted with the representative value, which is more likely to be correctable. For example, before data of the uncorrectable sector is flagged as a bad block, an error correction is performed on the representative value. Assuming this error correction is successful, the resulting data can be sent to the host instead of flagging the read data as having a bad block.

Figure 10:
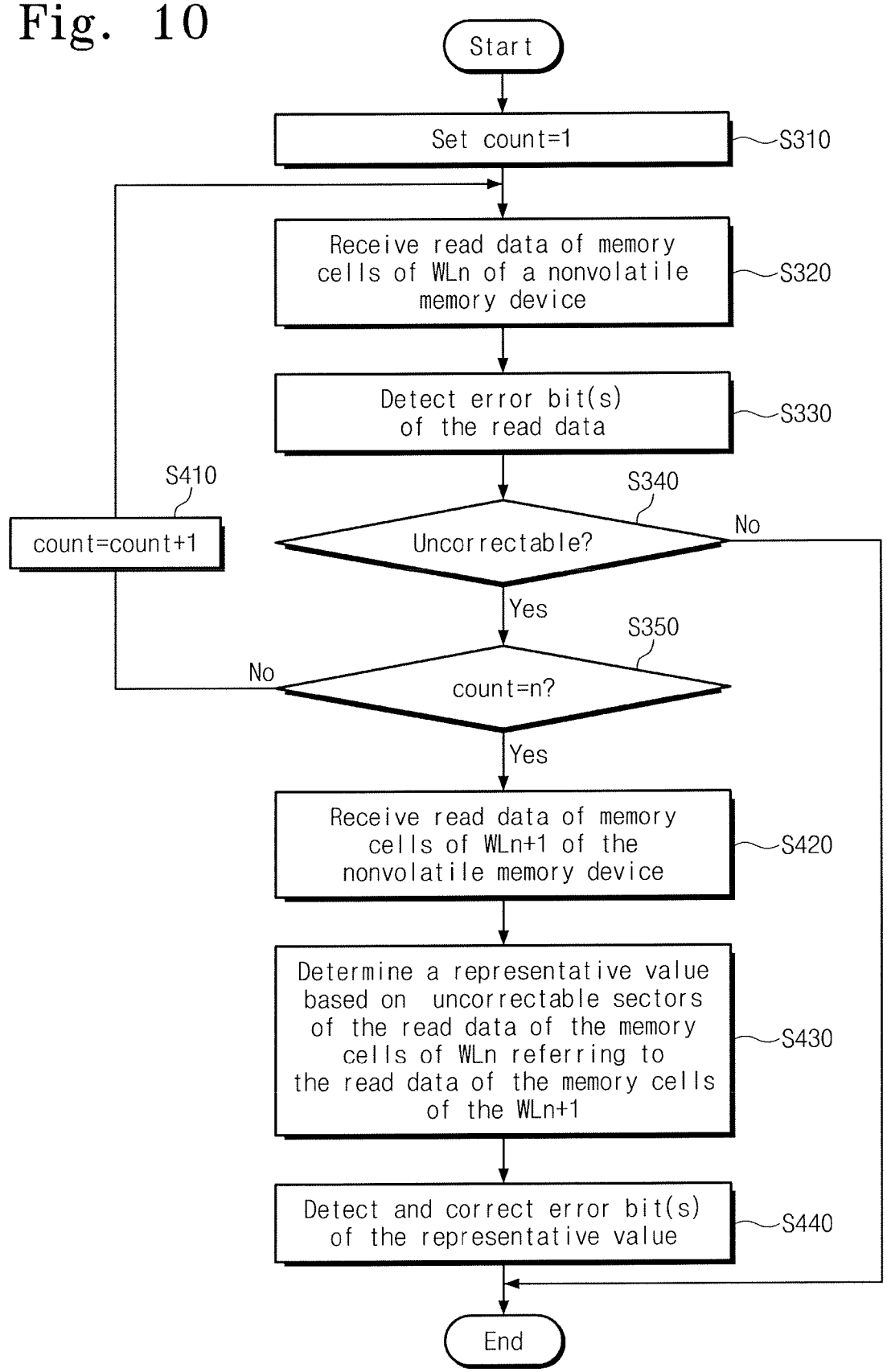
FIG. 10 is a flow chart illustrating a method of operating a memory controller according to an exemplary embodiment of the inventive concept.

FIG. 10 is a flow chart illustrating a method of operating a memory controller according to an exemplary embodiment of the inventive concept.

Referring to FIG. 10, steps S310 through S350 may be performed to be the same as the steps S110 through S150 described with reference to FIG. 4. In the step S320, the memory controller 110 receives read data of memory cells of an $n^{th}$ word line $WL_n$ from the nonvolatile memory device 120.

A step S410 may be performed to be the same as the step S210 described with reference to FIG. 4.

In a step S420, the memory controller 110 receives read data of memory cells of an $(n+1)^{th}$ word line $WL_{n+1}$ from the nonvolatile memory device 120. The received read data may be stored in the RAM 113.

In a step S430, the processing unit 115 performs an arithmetic operation on data bits of uncorrectable sectors included in each of the read data of memory cells of the $n^{th}$ word line $WL_n$ to determine a representative value. The processing unit 115 determines the representative value by considering a coupling between the $n^{th}$ word line $WL_n$ and the $(n+1)^{th}$ word line $WL_{n+1}$. The processing unit 115 may determine the representative value with reference to data bits of a sector (hereinafter it is referred to as 'corresponding sector') of read data of memory cells of the $(n+1)^{th}$ word line $WL_{n+1}$ corresponding to the uncorrectable sector of read data of memory cells of the $n^{th}$ word line $WL_n$. The processing unit 115 transmits the determined representative value to the error detection & correction circuit 114.

In a step S440, the error detection & correction circuit 114 performs operations of error detection and correction on the representative value.

In the present embodiment, described is a process that the processing unit 115 determines the representative value considering the coupling between word lines, but the inventive concept can be extended to considering a coupling between bit lines.

FIGS. 11 through 14 are drawings for explaining a coupling effect due to a program operation of a neighboring cell.

Figure 11:
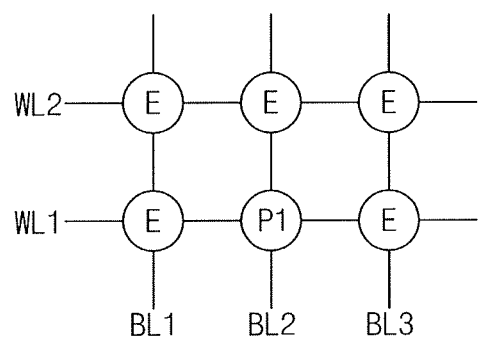
FIGS. 11 through 14 are drawings for explaining a coupling effect due to a program operation of a neighboring cell.

Referring to FIG. 11, a cell (hereinafter it is referred to as a reference cell) disposed at a point where a word line $WL_1$ and a bit line $BL_2$ cross each other is programmed as a first program state P1. Cells adjacent to the P1 cell, that is, cells disposed at points where word line $WL_1$ and bit lines $BL_1$ and $BL_3$ cross each other and cells disposed at points where word line $WL_2$ and bit lines $BL_1$, $BL_2$ and $BL_3$ cross each other are all programmed as an erase state E.

Figure 12:
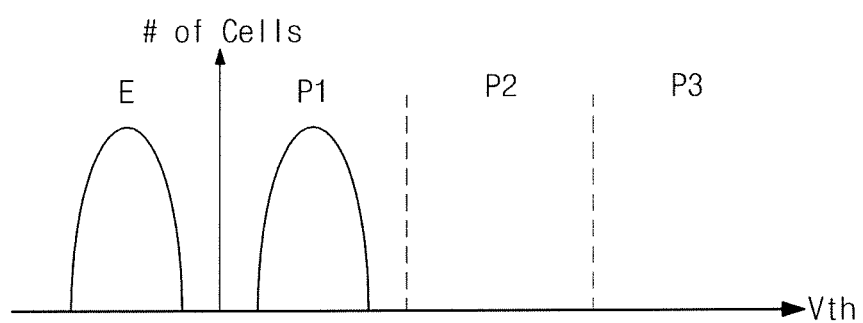

FIG. 12 illustrates a cell distribution corresponding to FIG. 11.

It is assumed that the neighboring cells of the reference cell having the first program state P1, that is, the cells disposed at the points where word line $WL_1$ and bit lines $BL_1$ and $BL_3$ cross each other and the cells disposed at the points where word line $WL_2$ and bit lines $BL_1$, $BL_2$ and $BL_3$ cross each other are all programmed as a third program state P3. The capacitors illustrated in FIG. 13 are capacitors modeled to express a coupling effect between the reference cell and the neighboring cells.

Figure 13:
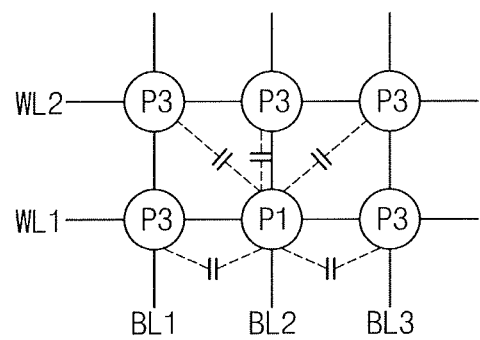
Figure 14:
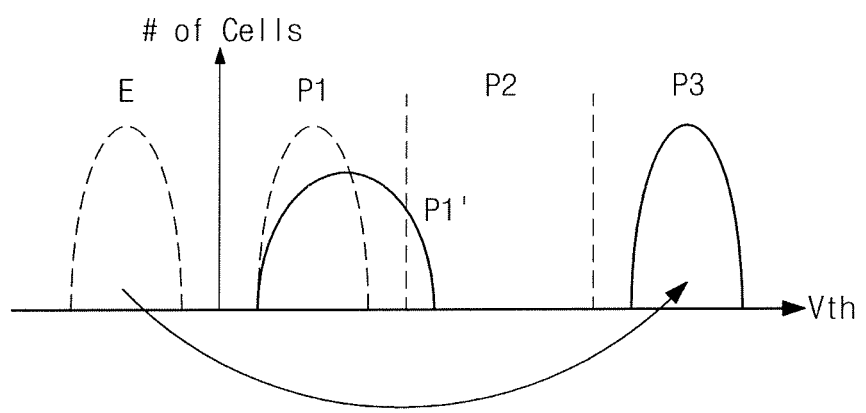

In the case that the neighboring cells of the reference cell are programmed as the third program state P3 like FIG. 13, a cell distribution may be the same as that illustrated in FIG. 14. As illustrated in FIG. 14, as the neighboring cells are programmed from the erase state to the third program state P3, the cell of the first program state P1 may have a distribution changed from the P1 to a P1' due to the coupling effect. A distribution of threshold voltage is changed from the P1 to the P1' by a coupling disturb.

In the case that the cells adjacent to the reference cell are programmed by a specific pattern (e.g., P3-P1-P3), a state stored in the reference cell may be changed due to the coupling effect.

Figure 15:
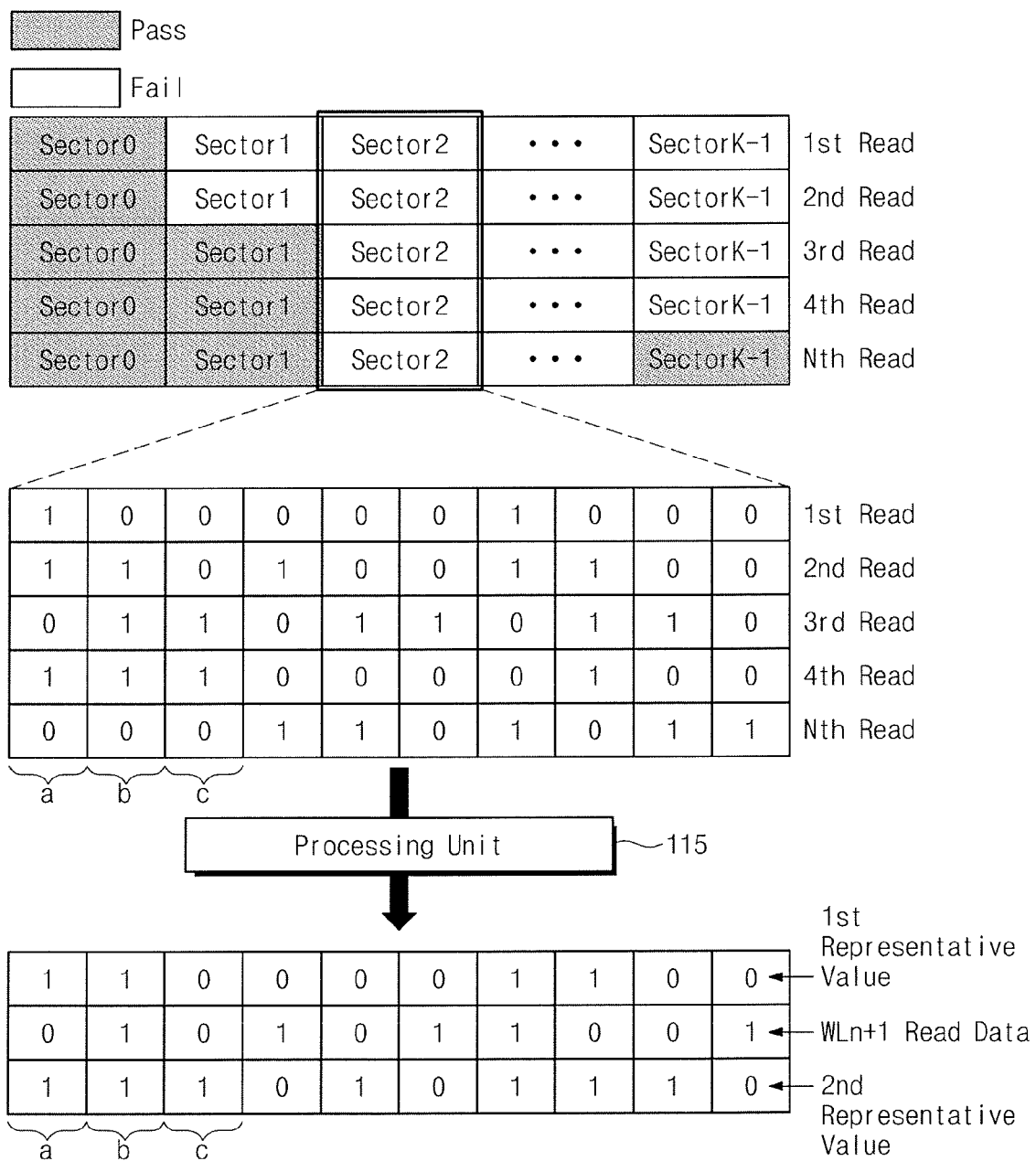
FIG. 15 is a block diagram for explaining a method of operating a memory controller of FIG. 10 according to an exemplary embodiment of the inventive concept.

FIG. 15 is a block diagram for explaining a method of operating the memory controller of FIG. 10 according to an exemplary embodiment of the inventive concept. It is assumed that read data of memory cells of an $n^{th}$ word line $WL_n$ is the same as that of FIG. 8. The error detection & correction circuit 114 judges the third sector Sector 2 of each of the read data uncorrectable.

Referring to FIG. 15, data bits constituting the third sector Sector 2 are illustrated. The third sector Sector 2 is illustrated to be comprised of ten data bits as an illustration in FIG. 15, but the inventive concept is not limited thereto.

The processing unit 115 performs an arithmetic operation on data bits of the third sector Sector 2 of each of read data of memory cells of the $n^{th}$ word line $WL_n$ stored in the RAM 113 to determine a first representative value. For instance, the processing unit 115 can determine the first representative value according to the most frequently occurring algorithm. According to the most frequently occurring algorithm, a process of determining the first representative value may be the same as that described with reference to FIG. 8.

The processing unit 115 may determine a second representative value considering data bits of the corresponding sector of read data of memory cells of the $(n+1)^{th}$ word line $WL_{n+1}$. Referring to the data bits of the corresponding sector of read data of memory cells of the $(n+1)^{th}$ word line $WL_{n+1}$, '1' means a state that is not programmed and '0' means a state that is programmed. If a memory cell is in the state that is programmed (e.g., '0'), it is quite probable that there is a coupling effect on neighboring word lines. Thus, the processing unit 115 can determine the second representative value by differently affecting the first representative value depending on whether the data bit of corresponding sector of read data of memory cells of the $(n+1)^{th}$ word line $WL_{n+1}$ has '1' or '0'.

In the case of an 'a' data bit among the data bits of the third sector, the processing unit 115 determines '1' as the second representative value. This is because the 'a' data bit of the first representative value is in the state that is not programmed (e.g., '1'), so it is quite probable that the memory cell corresponding to the 'a' data bit is not affected by a coupling effect. In the case of a 'b' data bit among the data bits of the third sector, the processing unit 115 determines '1' as the second representative value. This is because the data bit of the corresponding sector of read data of memory cells of the $(n+1)^{th}$ word line $WL_{n+1}$ is in the state that is not programmed. In the case of a 'c' data bit among the data bits of the third sector, the processing unit 115 determines '1' as the second representative value. This is because the 'c' data bit of the first representative value is in the state that is programmed (e.g., '0') and the data bit of the corresponding sector of read data of memory cells of the $(n+1)^{th}$ word line $WL_{n+1}$ is in the state that is programmed ('0'), so it is quite probable that the memory cell corresponding to the 'c' data bit is affected by a coupling effect.

The second representative value may be determined with respect to the rest of data bits using the same method. The processing unit 115 may determine the second representative value of data bits of the third sector Sector 2 of read data of memory cells of the $n^{th}$ word line $WL_n$ using the same process as describe above.

In an exemplary embodiment, the second representative value is generated by comparing each bit of the first representative value generated from reading data from a first word line with a same amount of data read from a second next or adjacent word line. For example, if the first bit of the read data from the next word line is not in a programmed state (e.g., has not been written), the first bit of the second representative value has the same value as the first bit of the first representative value. If the first bit of the read data from the next word line is in the programmed state (e.g., has been written), the first bit of the second representative value is the same as the first bit of the first representative value if the first bit of the first representative value is not in the programmed stated. If the first bit of the read data from the next word line is in the programmed state (e.g., has been written), the first bit of the second representative value is set to be different from the first bit of the first representative value if the first bit of the first representative value is in the programmed stated.

As described above, a method of operating a memory controller according to an exemplary embodiment of the inventive concept can more accurately restore an error bit of uncorrectable read data.

Figure 16:
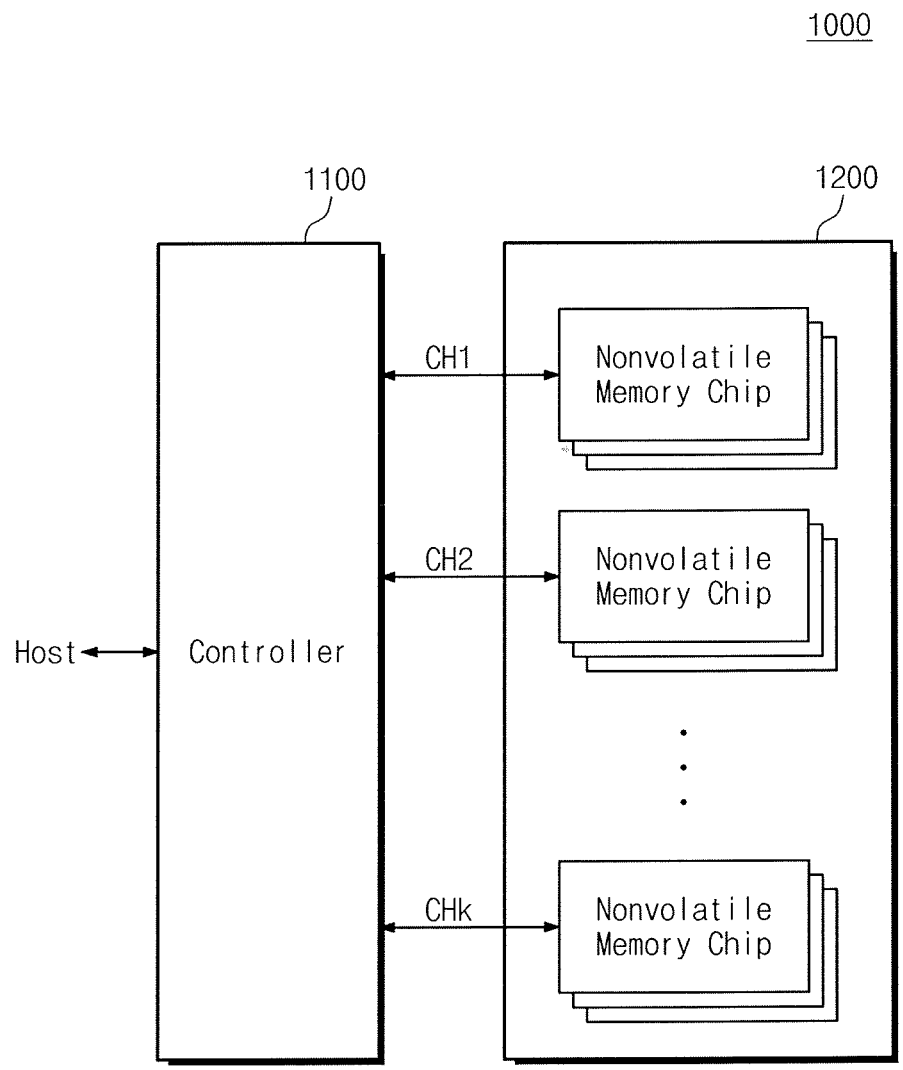
FIG. 16 is a block diagram illustrating an application example of a memory system of FIG. 1.

FIG. 16 is a block diagram illustrating an application example of a memory system of FIG. 1.

Referring to FIG. 16, a memory system 1000 includes a controller 1100 and a nonvolatile memory device 1200. The nonvolatile memory device 1200 may include a plurality of nonvolatile memory chips. The plurality of nonvolatile memory chips may be divided into a plurality of groups. Each group of the plurality of nonvolatile memory chips may be configured to communicate with the controller 1100 through one common channel.

In FIG. 16, the plurality of nonvolatile memory chips is illustrated to communicate with the controller 1100 through first through $k^{th}$ channels $CH_1$-$CH_k$. Each nonvolatile memory chip may be configured like the nonvolatile memory device 120 described with reference to FIG. 2. The controller 1100 may be configured like the memory controller 110 described with reference to FIG. 1.

The controller 1100 and the nonvolatile memory device 1200 may be integrated into one semiconductor device to form a memory card. For example, The controller 1100 and the nonvolatile memory device 1200 may be integrated into one semiconductor device to form a memory card such as a PC card (PCMCIA, personal computer memory card international association), a compact flash (CF) card, a smart media card (SM, SMC), a memory stick, a multimedia card (MMC, RS-MMC, MMCmicro), a SD card (SD, miniSD, micro SD, SDHC), a universal flash memory device (UFS).

The nonvolatile memory device 1200 or the memory system 1000 may be mounted by various types of packages such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), thin quad flat pack (TQFP), system in package (SIP), multi chip package (MCP), wafer-level fabricated package (WFP) and wafer-level processed stack package (WSP).

Figure 17:
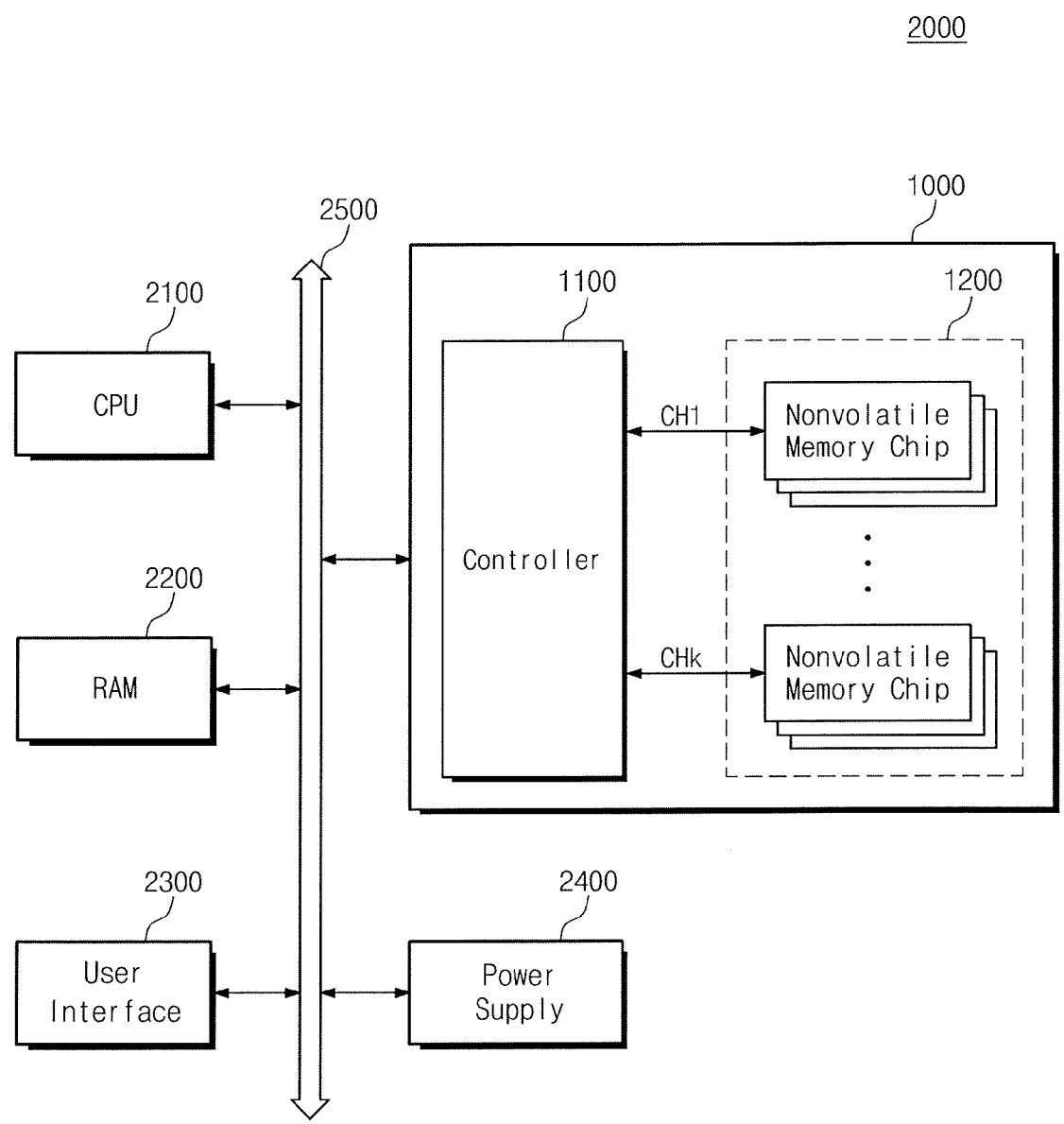
FIG. 17 is a block diagram illustrating a computing system including a memory system described with reference to FIG. 16.

FIG. 17 is a block diagram illustrating a computing system including the memory system described with reference to FIG. 16.

Referring to FIG. 17, the computing system 2000 includes a central processing unit 2100, a RAM 2200, a user interface 2300, a power supply 2400 and a memory system 1000.

The central processing unit 2100 can control elements of the computing system 2000, can execute an operating system and various programs, and can perform logical operations.

The RAM 2200 may be an operation memory of the computing system 2000. The RAM 2200 may include at least one of DRAM, SRAM, PRAM, MRAM, RRAM, FRAM, etc.

The user interface 2300 can exchange a signal with a user. The user interface 2300 may include user input interfaces such as a camera, a microphone, a keyboard, a mouse, a touch pad, a touch panel, a touch screen, a button, a switch, etc. The user interface 2300 may include user output interfaces such as a display device, a speaker, a lamp, a motor, etc. The display device may include a liquid crystal display (LCD), an active-matrix organic light-emitting diode (AMOLED) display device, a beam projector, etc.

The power supply 2400 can supply an operation power to the computing system 2000. In the case that the computing system 2000 is a mobile device, the power supply 2400 may be a battery (not shown).

The memory system 1000 is electrically connected to the central processing unit 2100, the RAM 2200, the user interface 2300 and the power supply 2400 through a system bus 2500. Data provided through the user interface 2300 or processed by the central processing unit 2100 is stored in the memory system 1000. The memory system 1000 may be embodied as described with reference to FIG. 1 or 16. The computing system 2000 may include both of the memory systems 100 and 1000 described with reference to FIGS. 1 and 16.

Figure 18:
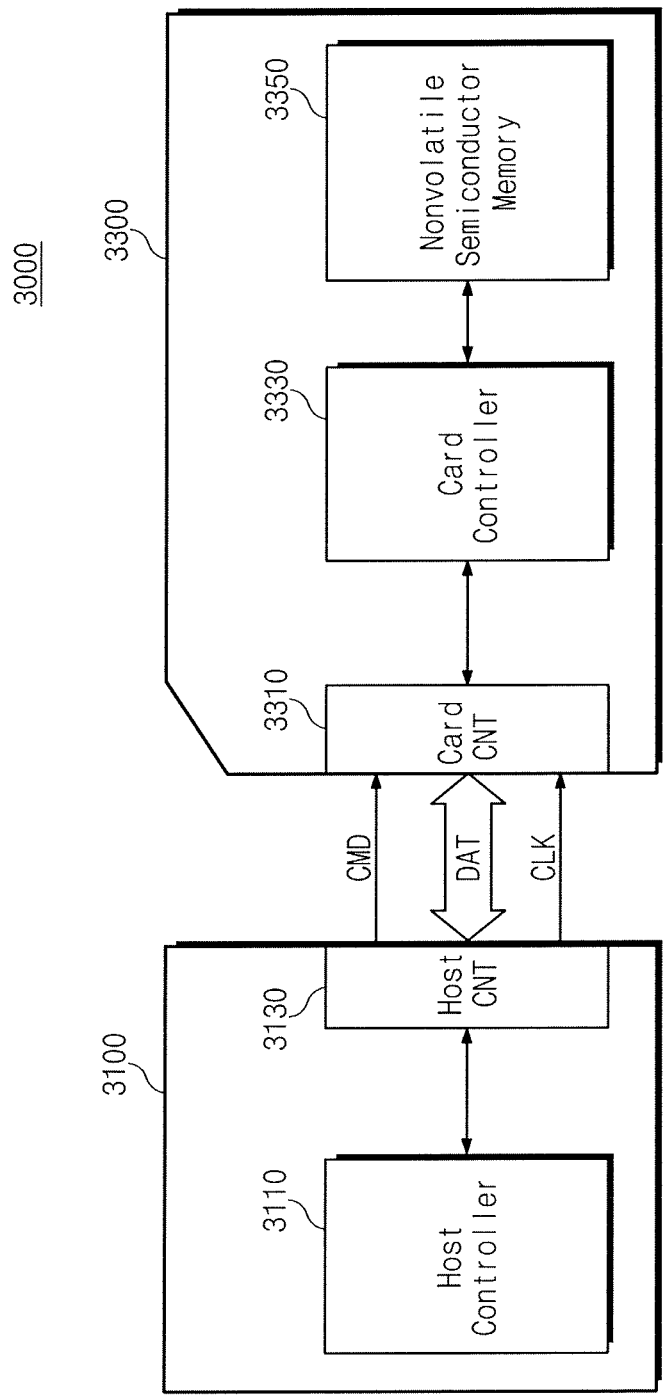
FIG. 18 is a block diagram illustrating a memory card system according to an exemplary embodiment of the inventive concept.

FIG. 18 is a block diagram illustrating a memory card system according to an exemplary embodiment of the inventive concept. Referring to FIG. 18, a memory card system 3000 includes a host 3100 and a memory card 3300. The host 3100 includes a host controller 3110 and a host connection unit 3130. The memory card 3300 includes a card connection unit 3310, a card controller 3330, and a nonvolatile semiconductor memory 3350.

Each of the host connection unit 3130 and the card connection unit 3310 may be formed of one or more pins. Such pins may include a command pin, a data pin, a clock pin, a power pin, and so on. The number of pins may vary according to a type of the memory card 3300. The card connection unit 3310 may be configured to communicate with an external device (e.g., the host 3100) by using one of various interface protocols such as USB, MMC, PCI-E, SAS, SATA, PATA, SCSI, ESDI, IDE, UFS, and the like.

The host 3100 is configured to write data in the memory card 3300 or to read data stored in the memory card 3300. The host controller 3110 provides a command CMD, a clock signal CLK generated within a clock generator (not shown) of the host 3100, and a data signal DAT to the memory card 3300 via the host connection unit 3130.

The card controller 3330 operates in response to a command provided via the card connection unit 3310. The nonvolatile semiconductor memory 3350 stores data provided from the host 3100. For instance, if the host 3100 is a digital camera, the nonvolatile semiconductor memory 3350 may store image data. In exemplary embodiments, the memory card 3300 is formed of an embedded multimedia card (eMMC). In other exemplary embodiments, the memory card 3300 is formed of a secure digital (SD) card.

The memory card 3300 may operate according to the inventive concepts. That is, in the memory card 3300, an error in partial data of each of a plurality of read data may be detected to judge whether each partial data is correctable or not. Further, the card controller 3330 may analyze the uncorrectable partial data with respect to the plurality of read data to determine a representative value, and may restore an error bit of the uncorrectable partial data by using the representative value.

Figure 19:
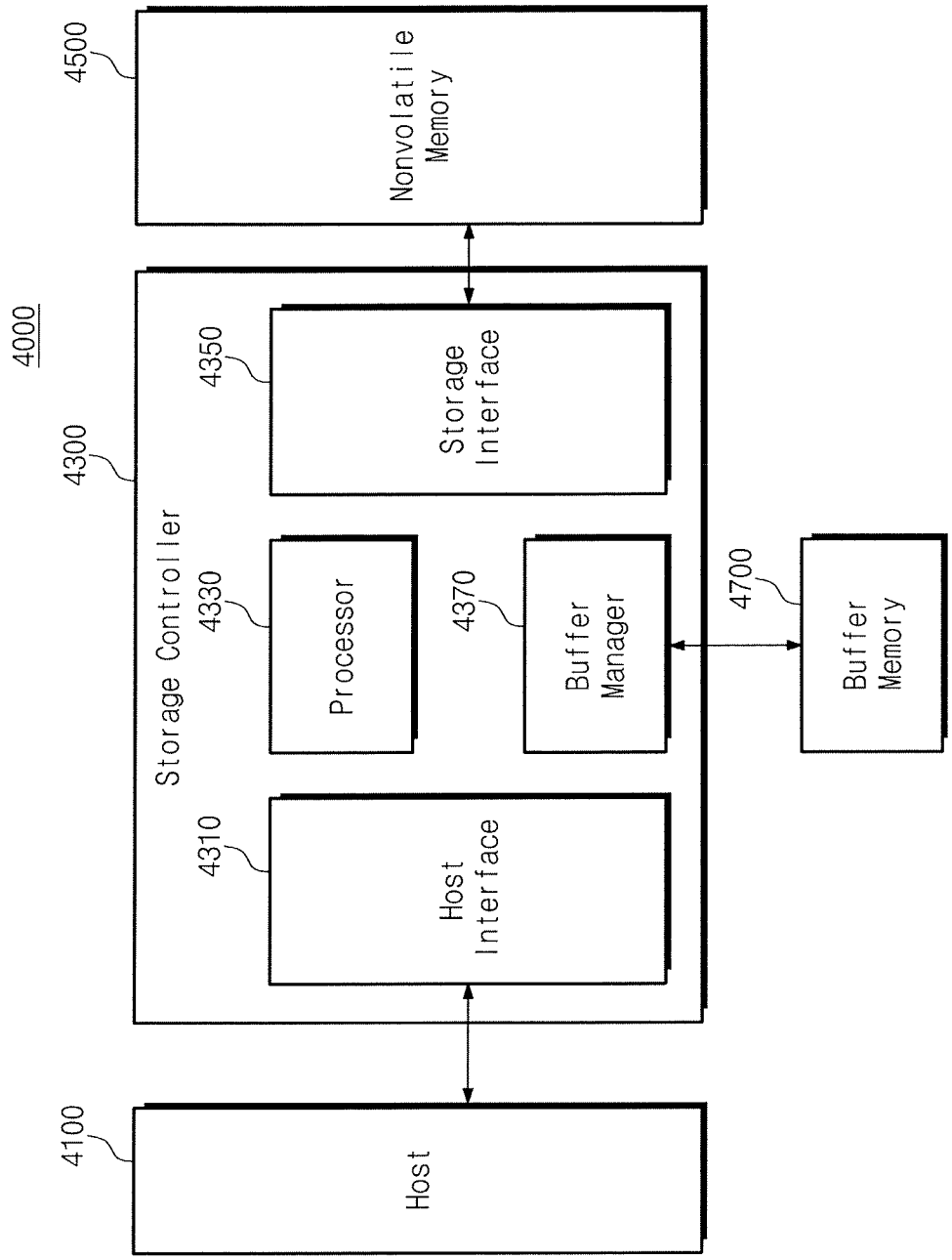
FIG. 19 is a block diagram illustrating a storage system according to an exemplary of the inventive concept.

FIG. 19 is a block diagram illustrating a storage system according to an exemplary embodiment of the inventive concept. Referring to FIG. 19, a storage system 4000 includes a host 4100, a storage controller 4300, a nonvolatile memory 4500, and a buffer memory 4700. The storage controller 4300 includes a host interface 4310, a processor 4330, a storage interface 4350, and a buffer manager 4370. The storage controller 4300, the nonvolatile memory 4500, and the buffer memory 4700 may form a storage device, such as a solid state drive (SSD).

The host 4100 is configured to write data in the storage device or to read data stored in the storage device. The host 4100 may communicate with storage controller 4300 through the host interface 4310. The host interface 4310 operates based on one of various interface protocols such as USB, PCI-E, SAS, SATA, PATA, SCSI, ESDI, IDE, and the like.

The nonvolatile memory 4500 is configured to store data. The storage interface 4350 may transfer data to be stored to the nonvolatile memory 4500. The storage interface 4350 may receive read data stored in the nonvolatile memory 4500. In exemplary embodiments, the nonvolatile memory 4500 may be a NAND flash memory, but is not limited thereto.

The buffer memory 4700 is configured to buffer operation data which is used in operation of the storage controller 4300. The buffer manager 4370 may transfer the operation data to the buffer memory 4700. The buffer manager 4370 may receive the operation data from the buffer memory 4700. In exemplary embodiments, the buffer memory 4700 may be one of a DRAM, SRAM, and SDRAM, but is not limited thereto.

The processor 4330 is configured to control the overall operations performed in the storage controller 4300. The host interface 4310, the storage interface 4350, and the buffer manager 4370 may operate according to the control of the processor 4330.

The storage device (i.e., a device formed of the storage controller 4300, the nonvolatile memory 4500, and the buffer memory 4700) may operate according to the inventive concepts. That is, read data read from the nonvolatile memory 4500 may be stored in the buffer memory 4700. Afterwards, in the storage device, an error in partial data of each of a plurality of read data may be detected to judge whether each partial data is correctable or not. Further, the storage controller 4300 may analyze the uncorrectable partial data with respect to the plurality of read data to determine a representative value, and may restore an error bit of the uncorrectable partial data by using the representative value.

Figure 20:
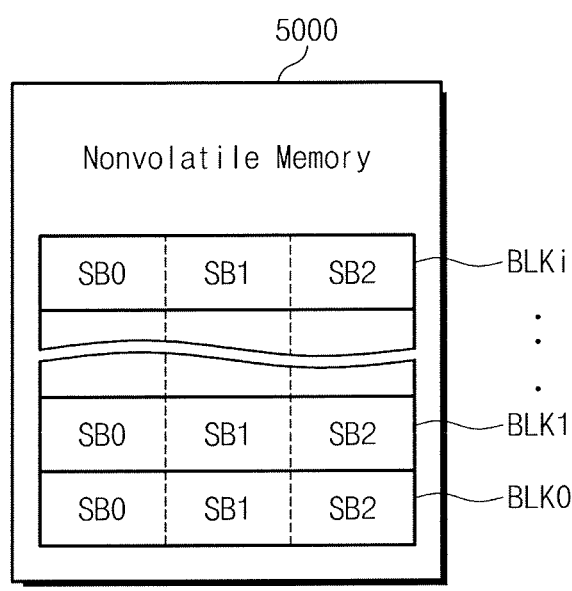
FIG. 20 is a conceptual diagram illustrating a configuration of a nonvolatile memory according to an exemplary of the inventive concept.

FIG. 20 is a conceptual diagram illustrating a configuration of a nonvolatile memory according to an exemplary embodiment of the inventive concept. A nonvolatile semiconductor memory 3350 of FIG. 18 or a nonvolatile memory 4500 may have a configuration illustrated in FIG. 20.

Herein, the sub-blocks "associated with" the selected sub-block may be sub-blocks in the same memory block as the selected sub-block, or they may be sub-blocks having heights higher than that of the selected sub-block in a 3D array structure of a nonvolatile memory 5000.

As used herein, the term "memory block" refers to a physical block unit that is capable of being erased as a unit. In the nonvolatile memory 5000 having the 3D array structure where word lines are stacked in a direction perpendicular to a substrate, a memory block may be a group of cell strings sharing a set of stacked word lines. A sub-block forms part of a memory block and generally comprises memory cells that share a common word line or selection line.

The nonvolatile memory 5000 comprises a plurality of memory blocks, each having plurality of memory cells arranged in rows and columns. Each memory cell may store single-level data (i.e., one bit) or multi-level data (i.e., multiple bits). The nonvolatile memory 5000 comprises a plurality of memory blocks BLK1 to BLKi, each of which corresponds to an erase unit. Each of memory blocks BLK1 to BLKi comprises a plurality of memory cells that are stacked in a direction intersecting a substrate to form cell strings.

Each of memory blocks BLK1 to BLKi can be divided into a plurality of sub-blocks. For example, a memory block BLK0 is divided into a plurality of sub-blocks SB0, SB1 and SB2. Herein, it is illustrated that a memory block is divided into three sub-blocks. However, the inventive concept is not limited thereto. For example, a memory block may be divided into two sub-blocks or four or more sub-blocks.

In certain embodiments of the inventive concept, where data stored in a sub-block is read, a read bias on selected memory cells may be adjusted in consideration of program/erased states of remaining sub-blocks. The read bias may be adjusted to compensate for an increase in channel resistance of sub-blocks associated with the selected sub-block. Also, the read bias may be adjusted to compensate for program disturbance which the selected sub-block suffers from the remaining sub-blocks.

Figure 21:
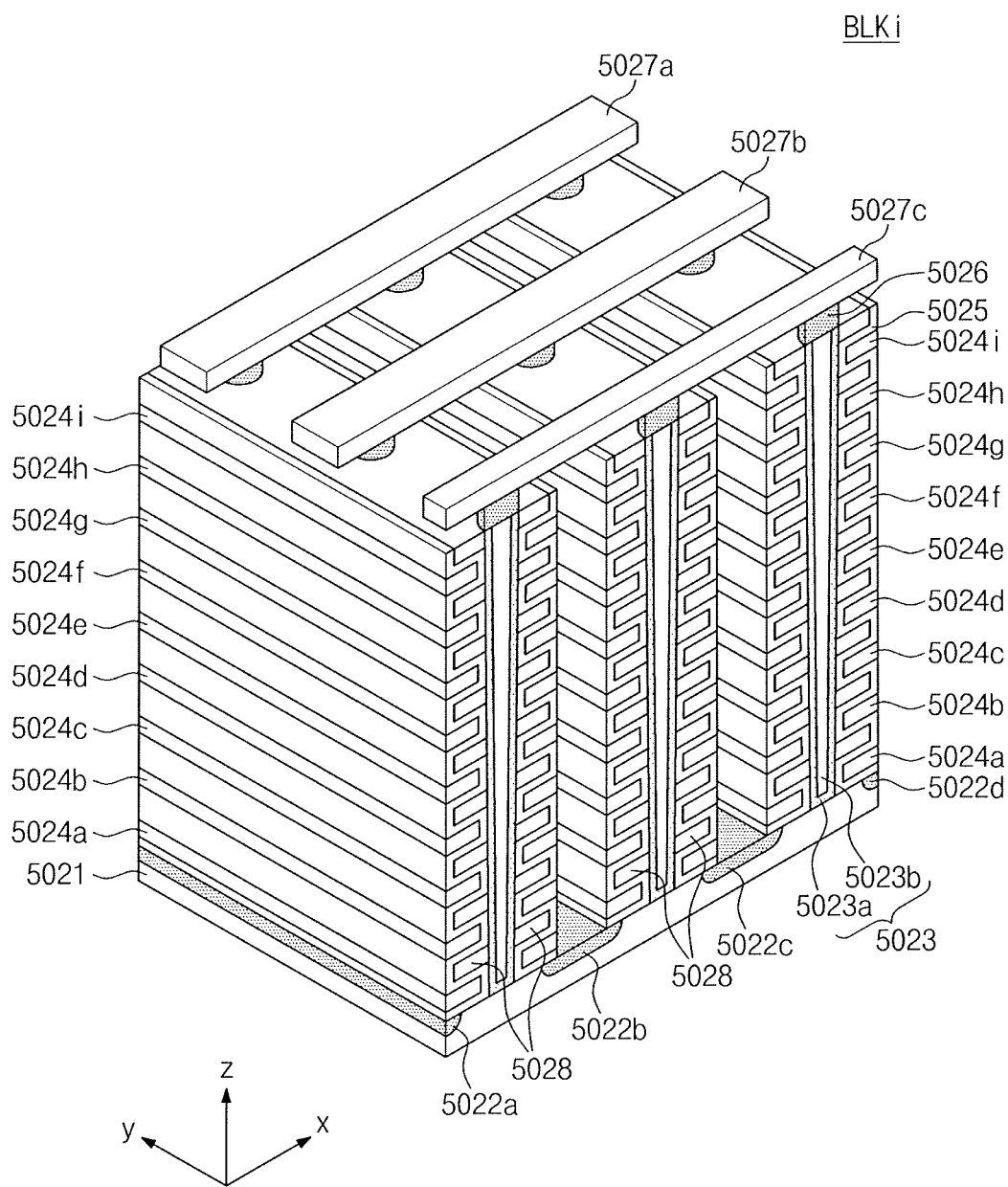
FIG. 21 is a perspective view illustrating an exemplary embodiment of a memory block in FIG. 20.

FIG. 21 is a perspective view illustrating an example memory block BLKi in FIG. 20. In this example, memory block BLKi comprises structures extending along a plurality of directions x, y, and z.

Referring to FIG. 21, memory block BLKi is disposed on a substrate 5021. Substrate 5021 can be formed of a p-well in which boron is injected, for example. Alternatively, substrate 5021 may be a pocket p-well disposed within an n-well. In the description that follows, it is assumed that substrate 5021 is a p-well, although substrate 5021 is not limited to the described example.

Substrate 5021 comprises a plurality of doping regions 5022a, 5022b, 5022c, and 5022d extending along the direction x. For example, doping regions 5022a, 5022b, 5022c, and 5022d may be formed of n-type conductors different from that of substrate 5021. Below, it is assumed that first to fourth doping regions 5022a, 5022b, 5022c, and 5022d are n-type. However, first to fourth doping regions 5022a, 5022b, 5022c, and 5022d are not limited to n-type.

A plurality of insulation materials 5028 extending along the y-direction are formed sequentially along the z-direction of substrate 5021 between first and second doping regions 5022a and 5022b. Insulation materials 5028 are formed to be spaced apart along the z-direction. Insulation materials 5028 typically comprise an insulating material such as silicon oxide.

A plurality of pillars 5023 are arranged sequentially along the y-direction of substrate 5021 between the first and second doping regions 5022a and 5022b. These pillars penetrate insulation materials 5028 along the z-direction. For example, pillars 5023 may contact with substrate 5021 through insulation materials 5028. Herein, pillar 5023 may also be formed on substrate 5021 between the second and third doping regions 5022b and 5022c and on the substrate between third and fourth doping regions 5022c and 5022d.

In general, each pillar 5023 may be formed of one or more materials. In one example, a surface layer 5023a of each pillar 5023 comprises a first type of silicon material, which may include a silicon material having the same type as that of substrate 5021. In the description that follows, it is assumed that surface layer 5023a of each pillar 5023 comprises p-type silicon. However, surface layer 5023a of each pillar 5023 is not limited to the p-type silicon. In the above example, an inner layer 5023b of each pillar 5023 is formed of an insulation material. For example, inner layer 5023b of each pillar 5023 may include an insulation material such as silicon oxide.

An insulation film 5025 is disposed between the first and second doping regions 5022a and 5022b along exposed surfaces of insulation materials 5028, pillars 5023, and substrate 5021. In certain embodiments, insulation film 5025 can be removed from an exposed surface (toward the third direction z) of last insulation material 5028 disposed along the z-direction.

In a region between first and second doping regions 5022a and 5022b, first conductive materials 5024a to 5024i are disposed on an exposed surface of insulation film 5025, respectively. For example, first conductive material 5024a extending along the y-direction is disposed between substrate 5021 and insulation material 5028 adjacent to substrate 5021. More specifically, first conductive material 5024a extending in the x-direction is disposed between substrate 5021 and insulation film 5025 of a lower surface of insulation material 5028 adjacent to substrate 5021.

Structures having the same components as first and second doping regions 5022a and 5022b are disposed between second and third doping regions 5022b and 5022c, and between third and fourth doping regions 5022c and 5022d.

Drains 5026 are disposed on pillars 5023, respectively. Drains 5026 may be formed of a second-type of silicon material, such as an n-type silicon material. Below, it is assumed that drains 5026 are formed of n-type silicon materials. However, drains 5026 are not limited to n-type silicon materials.

Second conductive materials 5027a to 5027c extending along the x-direction are disposed on drains 5026, respectively. Second conductive materials 5027a to 5027c are disposed sequentially along the y-direction. Second conductive materials 5027a to 5027c are connected with corresponding drains 5026. For example, drains 5026 and conductive material 5027c extending along the x-direction are connected via contact plugs, respectively.

Herein, each of first conductive materials 5024a to 5024i forms a word line or a selection line SSL/GSL. As word lines, a subset 5024b to 5024h of first conductive materials 5024a to 5024i may be interconnected at the same layer. Memory block BLKi is selected by selecting all of first conductive materials 5024a to 5024i. On the other hand, a sub-block is selected by selecting only a subset of first conductive materials 5024a to 5024i.

The number of first conductive materials 5024a to 5024i is not limited to the described examples, and the number of first conductive materials 5024a to 5024i can be changed according to various factors such as process and control techniques.

Figure 22:
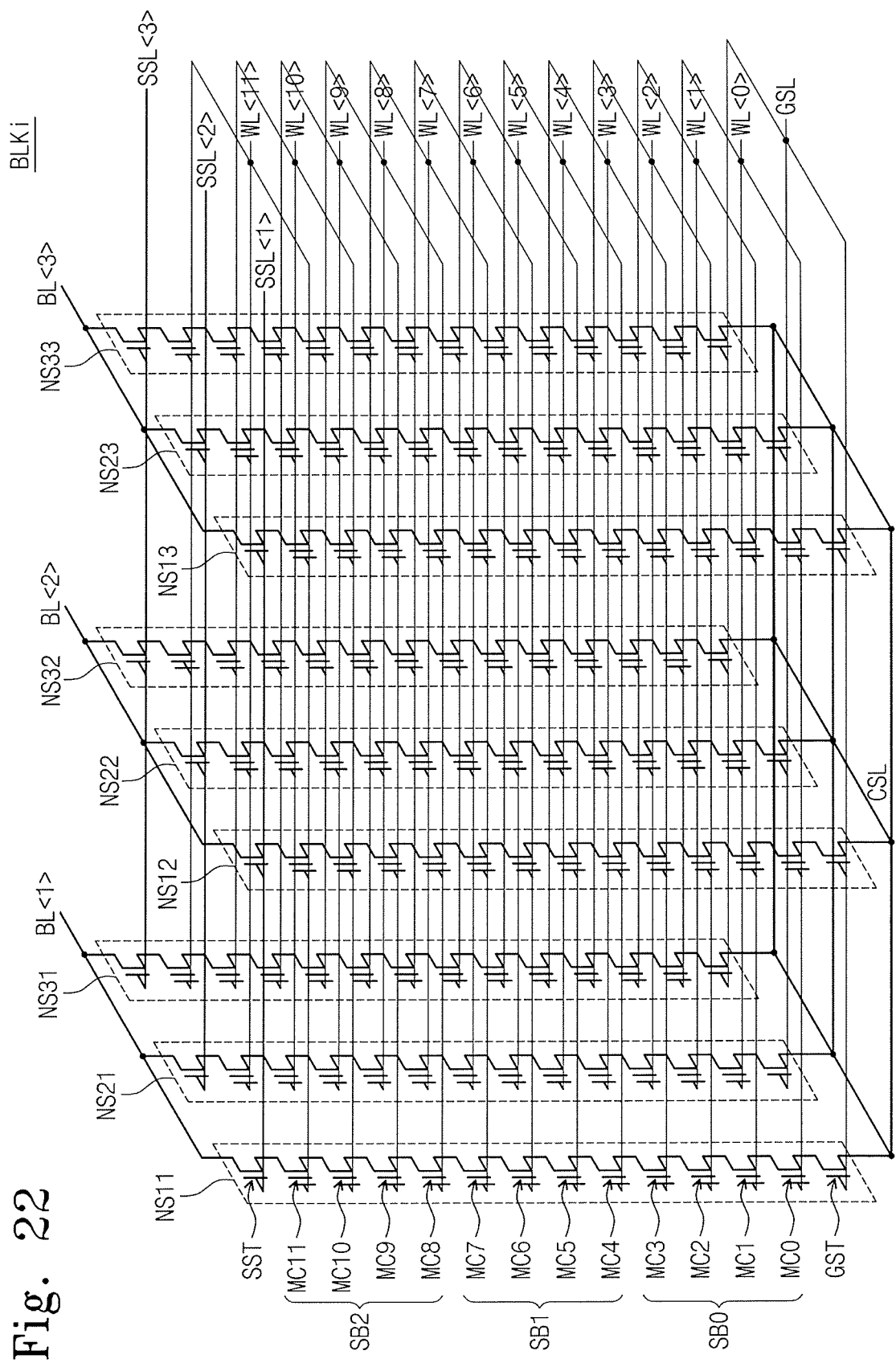
FIG. 22 is an exemplary embodiment of a circuit diagram of a memory block in FIG. 21.

FIG. 22 is an exemplary embodiment of a circuit diagram of a memory block BLKi in FIG. 21. Referring to FIGS. 21 to 22, NAND strings NS11 to NS33 are disposed between bit lines BL<1>, BL<2>, and BL<3> and a common source line CSL.

NAND strings NS11, NS21, and NS31 are disposed between a first bit line BL<1> and common source line CSL.

NAND strings NS12, NS22, and NS32 are disposed between a second bit line BL<2> and common source line CSL. NAND strings NS13, NS23, and NS33 are disposed between a third bit line BL<3> and common source line CSL. First to third bit lines BL<1> to BL<3> correspond to second conductive materials 5027a to 5027c extending in an x-direction, respectively.

A string selection transistor SST of each cell string is connected to a corresponding bit line BL. A ground selection transistor GST of each cell string is connected to common source line CSL. In each cell string, memory cells MC0 to MC11 are disposed between string selection transistor SST and ground selection transistor GST.

In the following description, cell strings are defined by row and column. Cell strings connected in common to one bit line form one column. For example, cell strings NS11 to NS31 connected to first bit line BL<1> correspond to a first column. Cell strings NS12 to NS32 connected to second bit line BL<2> correspond to a second column. Cell strings NS13 to NS33 connected to third bit line BL<3> correspond to a third column.

Cell strings connected to one string selection line SSL form one row. For example, cell strings NS11 through NS13 connected to a first string selection line SSL<1> form a first row. Cell strings NS21 through NS23 connected to a second string selection line SSL<2> form a second row. Cell strings NS31 to NS33 connected to a third string selection line SSL<3> form a third row.

Each cell string comprises a ground selection transistor GST controlled by a ground selection line GSL. Alternatively, although not shown in FIG. 22, cell strings corresponding to each row can be controlled by different ground selection lines.

Memory cells located at the same semiconductor layer share a word line. For example, memory cells MC0 in each of cell strings NS11 to NS33 are connected with a word line WL<0>. Cell strings in the same row share a string selection line SSL, and cell strings in different rows are connected to different string selection lines SSL<1>, SSL<2>, and SSL<3>, respectively. Common source line CSL is connected in common to multiple cell strings. For example, common source line CSL may be formed by interconnecting first to fourth doping regions 5022a, 5022b, 5022c, and 5022d.

The above-described memory block BLKi is divided into a plurality of sub-blocks SB0, SB1, and SB2 each smaller in size than memory block BLKi. Sub-blocks SB0, SB1, and SB2 are typically divided in a word line direction. Alternatively, sub-blocks SB0, SB1, and SB2 may be divided on the basis of a bit line or a string selection line. Sub-blocks in memory block BLKi may be erased independently regardless of a reference used to divide a memory block into sub-blocks.

As an example, sub-block SB0 comprises memory cells connected with word lines WL<0>, WL<1>, WL<2>, and WL<3>. Sub-block SB1 comprises memory cells connected with word lines WL<4>, WL<5>, WL<6>, and WL<7>. Sub-block SB2 comprises memory cells connected with word lines WL<8>, WL<9>, WL<10>, and WL<11>. Memory cells in sub-block SB0 can be selected and erased independent of the other sub-blocks SB1 and SB2. One or more of sub-blocks SB0, SB1, and SB2 may be selected and erased at the same time. The above operations may necessitate bias conditions for erasing memory cells by a sub-block unit.

The above description presents a method of dividing sub-blocks defined within one memory block BLKi. However, a reference used to divide one memory block into sub-blocks may not be limited to the described example. For instance, although memory block BLKi is divided into three sub-blocks, the inventive concept is not limited to this detail. As an alternative, for example, one memory block may be divided into two sub-blocks or four or more sub-blocks. Also, a sub-block may include two or three word lines or five or more word lines.

A memory controller and a method of operating a memory controller in accordance with exemplary embodiments of the inventive concepts can restore an error bit of uncorrectable read data and reduce an occurrence of a bad block due to uncorrectable read data.

At least one embodiment of the inventive concept can be embodied as computer-readable codes having computer executable instructions on a computer-readable medium. For example, the operations of FIG. 4 and FIG. 10 may be embodied as computer executable instructions. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

While the inventive concept has been described with reference to exemplary embodiments thereof, various modifications may be made to these embodiments without departing from the spirit and scope of the present invention.

What is claimed is:

1. A nonvolatile memory device, comprising:
a nonvolatile memory;
a buffer memory configured to store a plurality of read data transmitted from the nonvolatile memory;
an error detection and correction circuit configured to detect an error in partial data of each of the plurality of read data and judging whether the partial data is correctable or not on the basis of the detected error; and
a controller configured to analyze the uncorrectable partial data with respect to the plurality of read data to determine a representative value, and to transmit the representative value to the error detection and correction circuit,
wherein the plurality of read data is read through a read operation with respect to a same page.

2. The nonvolatile memory device of claim 1, wherein the plurality of read data is read by using a same read voltage.

3. The nonvolatile memory device of claim 1, wherein the page comprises a plurality of sectors and the partial data is one of the sectors.

4. The nonvolatile memory device of claim 1, wherein the plurality of read data is sequentially transmitted to the buffer memory according to the read operation.

5. The nonvolatile memory device of claim 4, wherein the error detection and correction circuit detects an error in the partial data according to an order that the plurality of read data is stored in the buffer memory.

6. The nonvolatile memory device of claim 5, wherein the error detection and correction circuit does not detect an error in the partial data of the following read data if the partial data of any one read data among the plurality of read data is correctable.

7. The nonvolatile memory device of claim 5, wherein the error detection and correction circuit detects an error in the partial data of the following read data and judges whether the partial data is correctable or not on the basis of the detected error if the partial data of any one read data among the plurality of read data is uncorrectable.

8. The nonvolatile memory device of claim 1, wherein the controller selects a bit which is most frequently obtained among data bits of the uncorrectable partial data to determine the representative value.

9. The nonvolatile memory device of claim 8, wherein the controller modifies the representative value based on a coupling effect between word lines.

10. A method of operating a nonvolatile memory device, the method comprising:
    detecting an error in partial data of each of a plurality of read data;
    judging whether each partial data is correctable or not on the basis of the corresponding detected error;
    analyzing the partial data with respect to the plurality of read data to determine a representative value if the partial data is uncorrectable; and
    restoring an error bit of the uncorrectable partial data by using the representative value,
    wherein the plurality of read data is read through a read operation with respect to a same page, and
    wherein the detecting and judging is repeatedly performed on each of the plurality of read data.

11. The method of claim 10, wherein the analyzing is performed after the detecting and judging is performed on all of the plurality of read data.

12. The method of claim 11, wherein the analyzing is performed when the partial data included in each of the plurality of read data is all uncorrectable.

13. The method of claim 10, wherein a bit which is most frequently obtained among data bits of the uncorrectable partial data is selected to determine the representative value in the analyzing.

14. The method of claim 10, further comprising modifying the representative value based on a coupling effect between word lines.

15. The method of claim 10, wherein the page comprises a plurality of sectors and the partial data is one of the sectors.

16. A nonvolatile memory device, comprising:
    a nonvolatile memory;
    a memory interface configured to read data from a same word line of the nonvolatile memory a number N times to generate N instances of the read data, wherein N is at least two, and each of the instances comprises a plurality of sectors;
    an error detection unit configured to detect whether a same sector in all the instances is uncorrectable;
    a controller configured to determine a representative value from all the instances of the uncorrectable sector and output the representative value; and
    an error correction unit configured to correct the uncorrectable sector by using the representative value.

17. The nonvolatile memory device of claim 16, wherein the error correction unit performs an error correction on the representative value, and provides a result of the correction to a host if the correction is successful.

18. The nonvolatile memory device of claim 16, wherein the controller generates the representative value by comparing data values of respective bits of all instances of the uncorrectable sector to determine which data value is most frequent for each bit position, and setting the representative value to include the determined frequent values.

19. The nonvolatile memory device of claim 16, wherein the N instances of the read data is generated by using a same read voltage.

20. The nonvolatile memory device of claim 16, wherein the controller modifies the representative value based on a coupling effect between the word line and a next word line.

* * * * *